(12) United States Patent
Shukla et al.

(10) Patent No.: US 10,484,301 B1
(45) Date of Patent: Nov. 19, 2019

(54) DYNAMIC RESOURCE DISTRIBUTION USING PERIODICITY-AWARE PREDICTIVE MODELING

(71) Applicant: Nutanix, Inc., San Jose, CA (US)

(72) Inventors: Himanshu Shukla, San Jose, CA (US); Rahul Singh, Mountain View, CA (US); Abhinay Nagpal, San Jose, CA (US); Aditya Ramesh, San Jose, CA (US)

(73) Assignee: NUTANIX, INC., San Jose, CA (US)

(*) Notice: Subject to any disclaimer, the term of this patent is extended or adjusted under 35 U.S.C. 154(b) by 109 days.

(21) Appl. No.: 15/283,004

(22) Filed: Sep. 30, 2016

(51) Int. Cl.
*G06F 15/173* (2006.01)
*H04L 12/911* (2013.01)
*H04L 29/08* (2006.01)
*H04L 12/26* (2006.01)
*H04L 12/24* (2006.01)
(Continued)

(52) U.S. Cl.
CPC ............ *H04L 47/823* (2013.01); *G06F 3/067* (2013.01); *G06F 3/0611* (2013.01); *G06F 3/0631* (2013.01); *G06F 9/45533* (2013.01); *H04L 41/22* (2013.01); *H04L 43/0894* (2013.01); *H04L 47/822* (2013.01); *H04L 67/1097* (2013.01)

(58) Field of Classification Search
CPC ... H04L 47/823; H04L 41/22; H04L 43/0894; H04L 47/822; H04L 67/1097; G06F 3/0611; G06F 3/0631; G06F 3/067; G06F 9/45533
USPC ....................................................... 709/226
See application file for complete search history.

(56) References Cited

U.S. PATENT DOCUMENTS 7,953,843 B2 * 5/2011 Cherkasova ...... H04L 29/06027
709/224
8,060,599 B2 * 11/2011 Cherkasova ............ G06F 9/505
709/203
(Continued)

OTHER PUBLICATIONS

Nagpal et al., "Stay-Fit: Seasonal Time series Analysis and Forecasting using Tournament Selection", 3 pages; Nutanix, Inc., San Jose, CA. USA.
(Continued)

*Primary Examiner* — Melvin H Pollack
(74) *Attorney, Agent, or Firm* — Vista IP Law Group, LLP

(57) ABSTRACT

Resource allocation techniques for distributed data storage. A set of distributed storage system historical resource usage measurements are collected and stored using distributed storage system measurement techniques. The resource usage metrics are associated with and/or derived from processing entities in the distributed storage computing system. An analysis module determines a training window time period corresponding to a portion of the collected distributed storage system historical resource usage measurements. The training window time period is determined so as to provide an earlier time boundary and a later time boundary that defines a periodically recurring portion of the distributed storage system historical resource usage measurements. A latest cycle of those periodically recurring measurements are then used to train a predictive model, which in turn is used to produce distributed storage system predicted resource usage characteristics. Resource allocation decisions are made based at least in part on predictions from the trained predictive model.

20 Claims, 15 Drawing Sheets

(51) Int. Cl.
   *G06F 9/455* (2018.01)
   *G06F 3/06* (2006.01)

(56) References Cited

U.S. PATENT DOCUMENTS

| | | | |
|---|---|---|---|
| 8,104,041 B2* | 1/2012 | Belady | G06F 11/3409 |
| | | | 709/226 |
| 8,291,411 B2* | 10/2012 | Beaty | G06F 9/4856 |
| | | | 718/1 |
| 8,326,970 B2* | 12/2012 | Cherkasova | G06Q 10/06 |
| | | | 709/224 |
| 8,464,254 B1 | 6/2013 | Vohra et al. | |
| 8,533,222 B2 | 9/2013 | Breckenridge et al. | |
| 8,549,518 B1 | 10/2013 | Aron et al. | |
| 8,560,671 B1 | 10/2013 | Yahalom et al. | |
| 8,601,473 B1 | 12/2013 | Aron et al. | |
| 8,626,902 B2* | 1/2014 | Singh | G06F 1/3206 |
| | | | 709/224 |
| 8,850,130 B1 | 9/2014 | Aron et al. | |
| 8,863,124 B1 | 10/2014 | Aron | |
| 8,997,097 B1 | 3/2015 | Aron et al. | |
| 9,015,122 B2* | 4/2015 | Harrison | G06F 17/3007 |
| | | | 707/646 |
| 9,032,077 B1* | 5/2015 | Klein | H04L 29/08 |
| | | | 370/395.21 |
| 9,047,083 B2 | 6/2015 | Gupta et al. | |
| 9,052,936 B1 | 6/2015 | Aron et al. | |
| 9,083,581 B1* | 7/2015 | Addepalli | H04W 4/046 |
| 9,152,643 B2* | 10/2015 | Whitehead | G06F 11/1448 |
| 9,154,589 B1* | 10/2015 | Klein | H04L 69/329 |
| 9,210,100 B2* | 12/2015 | Van Der Linden | G06F 9/5077 |
| 9,256,374 B1 | 2/2016 | Aron et al. | |
| 9,256,475 B1 | 2/2016 | Aron et al. | |
| 9,317,223 B2* | 4/2016 | Reohr | G06F 3/067 |
| 9,336,031 B2 | 5/2016 | Hackett et al. | |
| 9,354,912 B1 | 5/2016 | Aron et al. | |
| 9,389,887 B1 | 7/2016 | Aron et al. | |
| 9,405,569 B2* | 8/2016 | Greden | G06F 9/45545 |
| 9,417,903 B2* | 8/2016 | Bello | G06F 9/45558 |
| 9,563,697 B1 | 2/2017 | Caplan | |
| 9,575,784 B1 | 2/2017 | Aron et al. | |
| 9,595,054 B2* | 3/2017 | Jain | G06F 9/5072 |
| 9,619,257 B1 | 4/2017 | Aron et al. | |
| 9,619,261 B2* | 4/2017 | Gaurav | G06F 9/5077 |
| 9,626,275 B1 | 4/2017 | Hitchcock et al. | |
| 9,641,385 B1 | 5/2017 | Daniel et al. | |
| 9,665,386 B2 | 5/2017 | Bayapuneni et al. | |
| 9,705,817 B2* | 7/2017 | Lui | H04L 67/10 |
| 9,772,866 B1 | 9/2017 | Aron et al. | |
| 9,817,719 B2* | 11/2017 | Dain | G06F 11/14 |
| 9,836,229 B2* | 12/2017 | D'Sa | G06F 3/0619 |
| 9,842,153 B2* | 12/2017 | Bishop | G06F 16/27 |
| 9,882,969 B2* | 1/2018 | Reddy | H04L 67/38 |
| 9,886,215 B1 | 2/2018 | Ramachandran et al. | |
| 9,933,979 B2* | 4/2018 | Gu | G06F 3/067 |
| 9,959,188 B1* | 5/2018 | Krishnan | G06F 11/3062 |
| 9,961,017 B2* | 5/2018 | Jacob | H04L 47/828 |
| 10,067,722 B2* | 9/2018 | Lakshman | G06F 3/0689 |
| 10,127,234 B1 | 11/2018 | Krishnan et al. | |
| 10,296,494 B2* | 5/2019 | Davis | G06F 16/182 |
| 2004/0205206 A1 | 10/2004 | Naik et al. | |
| 2006/0010101 A1 | 1/2006 | Suzuki et al. | |
| 2006/0053262 A1 | 3/2006 | Prahlad et al. | |
| 2006/0218551 A1 | 9/2006 | Berstis et al. | |
| 2006/0224823 A1 | 10/2006 | Morley et al. | |
| 2007/0136402 A1 | 6/2007 | Grose et al. | |
| 2008/0005468 A1 | 1/2008 | Faibish et al. | |
| 2008/0147934 A1 | 6/2008 | Nonaka et al. | |
| 2008/0295096 A1 | 11/2008 | Beaty et al. | |
| 2008/0320482 A1 | 12/2008 | Dawson et al. | |
| 2009/0288084 A1 | 11/2009 | Astete et al. | |
| 2009/0319582 A1 | 12/2009 | Simek et al. | |
| 2010/0121828 A1 | 5/2010 | Wang | |
| 2010/0217651 A1 | 8/2010 | Crabtree et al. | |
| 2010/0275058 A1 | 10/2010 | Hashimoto et al. | |
| 2011/0185355 A1 | 7/2011 | Chawla et al. | |
| 2011/0202657 A1 | 8/2011 | Chang et al. | |
| 2012/0041914 A1 | 2/2012 | Tirunagari | |
| 2012/0109619 A1* | 5/2012 | Gmach | G06Q 10/06 |
| | | | 703/21 |
| 2012/0278275 A1 | 11/2012 | Danciu et al. | |
| 2013/0054910 A1 | 2/2013 | Vaghani et al. | |
| 2013/0086341 A1 | 4/2013 | Vasavi et al. | |
| 2013/0139152 A1 | 5/2013 | Chang et al. | |
| 2013/0174152 A1 | 7/2013 | Yu | |
| 2013/0185718 A1 | 7/2013 | Shiva et al. | |
| 2014/0082614 A1 | 3/2014 | Klein et al. | |
| 2014/0157260 A1 | 6/2014 | Balani et al. | |
| 2014/0282525 A1 | 9/2014 | Sapuram et al. | |
| 2014/0289268 A1 | 9/2014 | Patil et al. | |
| 2014/0344453 A1* | 11/2014 | Varney | H04L 41/0803 |
| | | | 709/224 |
| 2015/0033224 A1 | 1/2015 | Maheshwari et al. | |
| 2015/0106578 A1* | 4/2015 | Warfield | G06F 3/0613 |
| | | | 711/158 |
| 2015/0169291 A1 | 6/2015 | Dube et al. | |
| 2015/0234869 A1* | 8/2015 | Chan | G06F 17/30312 |
| | | | 707/603 |
| 2015/0339572 A1 | 11/2015 | Achin et al. | |
| 2015/0341223 A1 | 11/2015 | Shen et al. | |
| 2015/0350102 A1 | 12/2015 | Leon-garcia et al. | |
| 2015/0379429 A1* | 12/2015 | Lee | G06N 99/005 |
| | | | 706/11 |
| 2016/0019094 A1 | 1/2016 | Habdank et al. | |
| 2016/0048337 A1 | 2/2016 | Prahlad et al. | |
| 2016/0048408 A1* | 2/2016 | Madhu | G06F 11/1458 |
| | | | 718/1 |
| 2016/0203176 A1* | 7/2016 | Mills | G01D 9/005 |
| | | | 707/609 |
| 2016/0224384 A1 | 8/2016 | Gokhale et al. | |
| 2016/0232450 A1 | 8/2016 | Chen et al. | |
| 2016/0300142 A1 | 10/2016 | Feller et al. | |
| 2016/0359955 A1 | 12/2016 | Gill et al. | |
| 2016/0373377 A1 | 12/2016 | Cao et al. | |
| 2016/0379125 A1 | 12/2016 | Bordawekar et al. | |
| 2017/0031816 A1 | 2/2017 | Lee et al. | |
| 2017/0364307 A1* | 12/2017 | Lomelino | G06F 3/0659 |
| 2017/0364387 A1 | 12/2017 | Ahmed et al. | |
| 2018/0046487 A1* | 2/2018 | Matters | G06F 9/45558 |
| 2018/0060134 A1 | 3/2018 | Bianchini et al. | |
| 2018/0225139 A1* | 8/2018 | Hahn | G06F 9/45558 |
| 2019/0146707 A1* | 5/2019 | Fetik | G06F 3/0653 |

OTHER PUBLICATIONS

Dlessner, "Stay-Fit: Getting Ready for What Is Next in Prism", Nutanix, Inc., Dec. 8, 2015, 4 pages.

[Nutanix-049] U.S. Appl. No. 15/006,435, filed Jan. 26, 2016, 65 pages.

[Nutanix-053] U.S. Appl. No. 15/173,577, filed Jun. 3, 2016, 102 pages.

[Nutanix-081] U.S. Appl. No. 15/191,387, filed Jun. 23, 2016, 59 pages.

Non-Final Office Action dated Mar. 22, 2018 for related U.S. Appl. No. 15/191,387.

Wikipedia. "Feasible region". Nov. 16, 2015. 2 pages.

"What Is Multiobjective Optimization?" Feb. 16, 2015. 1 page. http://www.mathworks.com/help/gads/what-is-multiobjective-optimization.html.

Caramia et al. "Multi-objective Optimization". 2008. 27 pages. Chapter 2. Springer-Verlag London.

Wikipedia. "Gittins index". Dec. 7, 2015. 6 pages.

Pandelis et al. "On the optimality of the Gittins index rule for multi-armed bandits with multiple plays". Jul. 1999. 13 pages.

Deel et al. "Linear Tape File System (LTFS) Format Specification". Dec. 21, 2013. 69 pages.

Non-Final Office Action dated Nov. 14, 2017 for related U.S. Appl. No. 15/186,235.

Non-Final Office Action dated Nov. 27, 2017 for related U.S. Appl. No. 15/160,246.

(56) References Cited

OTHER PUBLICATIONS

Final Office Action dated Mar. 30, 2018 for related U.S. Appl. No. 15/160,246.
Notice of Allowance dated May 16, 2018 for related U.S. Appl. No. 15/186,235.
Non-Final Office Action dated May 24, 2018 for related U.S. Appl. No. 15/351,388.
Non-Final Office Action dated Jun. 8, 2018 for related U.S. Appl. No. 15/298,149.
Non-Final Office Action dated Jun. 29, 2018 for related U.S. Appl. No. 15/352,495.
Mei et al., Performance Analysis of Network I/O Workload in Virtualized Data Centers, 2010, IEEE, pp. 1-16 (Year: 2010).
Paul et al., Performance Monitoring and Capacity Planning, 2006, VMWorld, pp. 1-39 Centers (Year: 2006).
Notice of Allowance dated Aug. 15, 2018 for related U.S. Appl. No. 15/160,246.
Final Office Action dated Aug. 15, 2018 for related U.S. Appl. No. 15/191,387.
U.S. Appl. No. 15/298,107, filed Oct. 19, 2016, 57 pages.
U.S. Appl. No. 15/341,549, filed Nov. 2, 2016, 90 pages.
[Nutanix-047] U.S. Appl. No. 15/006,416, filed Jan. 26, 2016, 64 pages.
Notice of Allowance dated Oct. 18, 2018 for related U.S. Appl. No. 15/298,149, 5 pages.
Advisory Action dated Nov. 1, 2018 for related U.S. Appl. No. 15/191,387, 3 pages.
Final Office Action dated Nov. 16, 2018 for related U.S. Appl. No. 15/351,388, 19 pages.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Notice of Allowance dated Dec. 31, 2018 for related U.S. Appl. No. 15/191,387, 8 pages.
Final Office Action dated Feb. 15, 2019 for related U.S. Appl. No. 15/352,495, 22 pages.
Non-Final Office Action dated Apr. 29, 2019 for U.S. Appl. No. 15/298,149, 10 pages.
Notice of Allowance dated May 22, 2019 for U.S. Appl. No. 15/191,387.
Non-Final Office Action dated May 24, 2019 for related U.S. Appl. No. 15/251,244.
Non-Final Office Action dated Jun. 6, 2019 for related U.S. Appl. No. 15/181,094.
Non-Final Office Action dated Jul. 5, 2019 for related U.S. Appl. No. 15/394,654.
Final Office Action dated Aug. 16, 2019 for U.S. Appl. No. 15/298,149.

* cited by examiner

| ID | Metric | Condition | Operation(s) | Constraint(s) | Display | When to Apply |
|---|---|---|---|---|---|---|
| ... | | | | | | ... |
| R23 | Storage Usage | > 80% | Reduce snapshot frequency | Data Policy | Snapshot Controls | ~every day |
| R24 | Storage Usage | > 80% | Release stale VMs | Time Powered Off | Candidate VMs | ~every three days |
| ... | | | | | | ... |
| R49 | I/O Usage | > 70% | Migrate high usage ACs | Availability Policy | Candidate ACs | ~every hour |
| R50 | CPU Usage | > 70% | Migrate high usage VMs | Affinity Policy | Candidate VMs | ~every hour |
| R51 | CPU Usage | > 70% | Expand cluster | Budget | Node Details | ~every two weeks |
| ... | | | | | | |

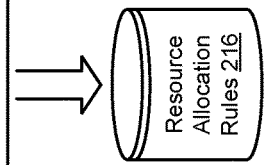

Resource Allocation Rules 216

FIG. 4

DYNAMIC RESOURCE DISTRIBUTION USING PERIODICITY-AWARE PREDICTIVE MODELING

FIELD

This disclosure relates to distributed data storage, and more particularly to techniques for dynamic resource distribution using periodicity-aware predictive modeling.

BACKGROUND

The deployment of distributed computing and storage systems continues to increase as users seek the resource usage efficiencies offered by such systems. Specifically, for example, certain components of a distributed computing system can coordinate to efficiently use a set of computational or compute resources, while certain components of a distributed storage system can coordinate to efficiently use a set of data storage resources or facilities. A hyperconverged distributed system coordinates efficient use of compute and storage resources by and between the components of the distributed system. Distributed systems that support virtualized entities to facilitate efficient resource utilization can be referred to as distributed virtualization systems. For example, a distributed virtualization system might include virtual machines (VMs) to improve the utilization of computing resources. Such VMs can be characterized as software-based computing "machines" implemented in a hypervisor-assisted virtualization environment that emulates the underlying hardware resources (e.g., CPU resources, memory resources, networking resources, etc.).

For example, multiple VMs can operate on one physical machine (e.g., host computer) running a single host operating system, while the VMs might run multiple applications on various respective guest operating systems. Another form of virtualization in modern distributed systems is operating system virtualization or container virtualization. The containers implemented in container virtualization environments comprise groups of processes and/or resources (e.g., memory, CPU, disk, etc.) that are isolated from the host computer and other containers. Such containers directly interface with the kernel of the host operating system with, in most cases, no hypervisor layer. As an example, certain applications can be implemented as containerized applications (CAs).

The use of VMs, CAs, and other virtualized entities in distributed virtualization systems to improve the utilization of system resources continues to increase. For example, some clusters in a distributed virtualization system might scale to hundreds of nodes or more that support several thousands or more autonomous VMs and/or CAs. As such, the topology and/or resource usage activity of the distributed system can be highly dynamic. Users (e.g., administrators) of such large scale, highly dynamic, distributed systems desire capabilities (e.g., management tools) that facilitate analyzing and/or managing the distributed system resources so as to satisfy not only the current but also the forthcoming demand for resources. For example, the administrators might desire capabilities that facilitate cluster management (e.g., deployment, maintenance, scaling, etc.), virtualized entity management (e.g., creation, placement, sizing, protection, migration, etc.), storage management (e.g., allocation, policy compliance, location, etc.), and/or management of other aspects pertaining to the resources of the distributed system.

Unfortunately, legacy techniques for managing resources in distributed virtualization systems can present limitations at least as pertaining to accounting for the seasonal or periodically-recurring resource usage characteristics in highly dynamic systems. For example, some techniques implement a distributed scheduling (DS) capability to allocate resources in the distributed virtualization system based at least in part on observed resource usage. Specifically, such DS techniques might determine a peak usage value and a mean usage value for a given resource usage metric (e.g., CPU usage, memory usage, input and output or I/O usage, etc.) based on a set of historical observations in a fixed window of time (e.g., prior 24 hours). The determined peak and mean usage values can then be used for comparing to the then-current observed resource usage to determine the resource allocation operation or operations (e.g., actions), if any, that can be performed to improve resource utilization.

As an example, such resource allocation operations might comprise increasing compute resource capacity at one node and/or increasing storage resource capacity at another node. However, merely using the peak and/or mean of the historical observations in the fixed time window may not accurately reflect the dynamic resource usage characteristics (e.g., periodicity, seasonality, scaling effects, etc.) of the system, resulting in misallocation of resources. For example, a resource allocation operation to move a first VM to a target node might be determined using the foregoing legacy techniques, while moving a second VM to some other target node might be a more appropriate resource allocation operation, given a set of then-current dynamic resource usage characteristics. As a more detailed example, a legacy resource allocation operation might determine to move VM123 to AccountingNode1023 based on the peaks and means that were measured in the preceding 8 hours (e.g., from March 29th), however making that determination based on only the preceding 8 hours might be shortsighted in that it does not recognize that that AccountingNode1023 is regularly (e.g., with a periodicity of about a quarter of a year) tasked to be used as a quarter-end report generator node. In this case, moving VM123 to AccountingNode1023 at that moment in time would add the load of VM123 to a node that is already, or predictably soon to be, heavily loaded.

What is needed is a technique or techniques to improve over legacy techniques and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for dynamic resource distribution using periodicity-aware predictive modeling, which techniques advance the relevant technologies to address technological issues with legacy approaches. More specifically, the present disclosure provides a detailed description of techniques used in systems, methods, and in computer program products for dynamic resource distribution using periodicity-aware predictive modeling. Certain embodiments are directed to technological solutions for implementing periodicity-aware predictive models for various resource usage metrics to facilitate efficient dynamic resource distribution in a distributed virtualization environment.

The disclosed embodiments modify and improve over legacy approaches. In particular, the herein-disclosed techniques provide technical solutions that address the technical problems attendant to accounting for seasonally-periodic resource usage characteristics when determining resource allocation in a distributed virtualization environment. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of hyperconverged computing platform management as well as advances in various technical fields related to computing cluster management.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

FIG. 4 presents a data structure for codifying resource allocation rules that are used in systems for dynamic resource distribution using periodicity-aware predictive modeling, according to some embodiments.

DETAILED DESCRIPTION

Figure 1A:
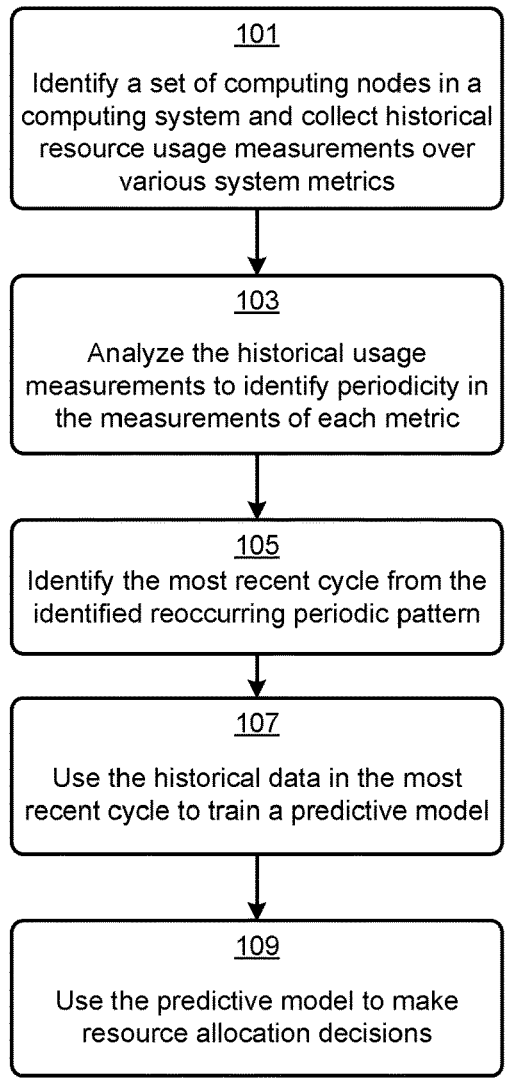
FIG. 1A illustrates a distributed scheduling technique, according to some embodiments.

Embodiments in accordance with the present disclosure address the problem of accounting for seasonally-periodic resource usage characteristics when determining resource allocation in a distributed virtualization environment. Some embodiments are directed to approaches for implementing periodicity-aware predictive models for various resource usage metrics to facilitate efficient dynamic resource distribution in a distributed virtualization environment. The accompanying figures and discussions herein present example environments, systems, methods, and computer program products for dynamic resource distribution using periodicity-aware predictive modeling.

Overview

Disclosed herein are techniques for implementing periodicity-aware predictive models for various resource usage metrics to facilitate efficient dynamic resource distribution in a distributed virtualization environment. In certain embodiments, the predictive models can be generated based at least in part on historical resource usage measurements from one or more respective training windows. The training windows are dynamically determined to capture certain dynamic characteristics, such as periodicity, pertaining to the resource usage metrics. A set of predicted resource usage characteristics produced by the predictive models are used to determine various resource allocation operations. In some embodiments, the predicted resource usage characteristics can be compared to then current resource usage measurements to determine the resource allocation operations. In other embodiments, certain other data, such as resource allocation rules, can be used to determine the resource allocation operations. In one or more embodiments, the resource allocation operations can be automatically executed by the system. In yet other embodiments, the resource allocation operations can be presented to an administrator to accept or decline any of the operations.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A illustrates a distributed scheduling technique as implemented in systems for dynamic resource distribution using periodicity-aware predictive modeling. As shown, the flow 1A00 commences upon identifying a set of computing nodes in a computing system (step 101). Performance measurements are taken at the nodes, between the nodes, and/or at any point on the system where a usage measurement can be taken. The performance measurements are taken over a time period, possibly a long time (e.g., a week or a month or longer) and stored as historical usage data for subsequent analysis. One such analysis (step 103) includes identification of periodicity in the historical usage data. Identification of periodicity includes identification of a period of time where the historical usage data has a repeating pattern over time. The repeating time period might be a day, or a week, or a month, or an hour or a minute, depending on the nature of the metric corresponding to the analyzed usage data.

The identified pattern of periodicity, together with the determined bounds of time where the historical usage data has a repeating pattern is used for (1) bounding the most recent cycle (e.g., a full period) from the identified reoccurring periodic pattern (step 105), and (2) after bounding the data pertaining to the identified most recent full period, that data is used to train a predictive model (step 107). The trained predictive model is then used in making resource allocation decisions (step 109).

Using a predictive model that is trained or retrained based on identified periodic data yields better (e.g., more likely correct) resource allocation/reallocation decisions. Examples of the aforementioned better (e.g., more likely correct) resource allocation can be contrasted with techniques that use a fixed window of training data. As is depicted hereunder, using a fixed window that is too short (e.g., shorter than a full periodic cycle) or too long (e.g., longer, but still not capturing the periodicity) yields wrong results in a variety of circumstances. Some such circumstances, as well as applicable techniques and corresponding results are discussed as pertains to FIG. 1B.

Figure 1B:
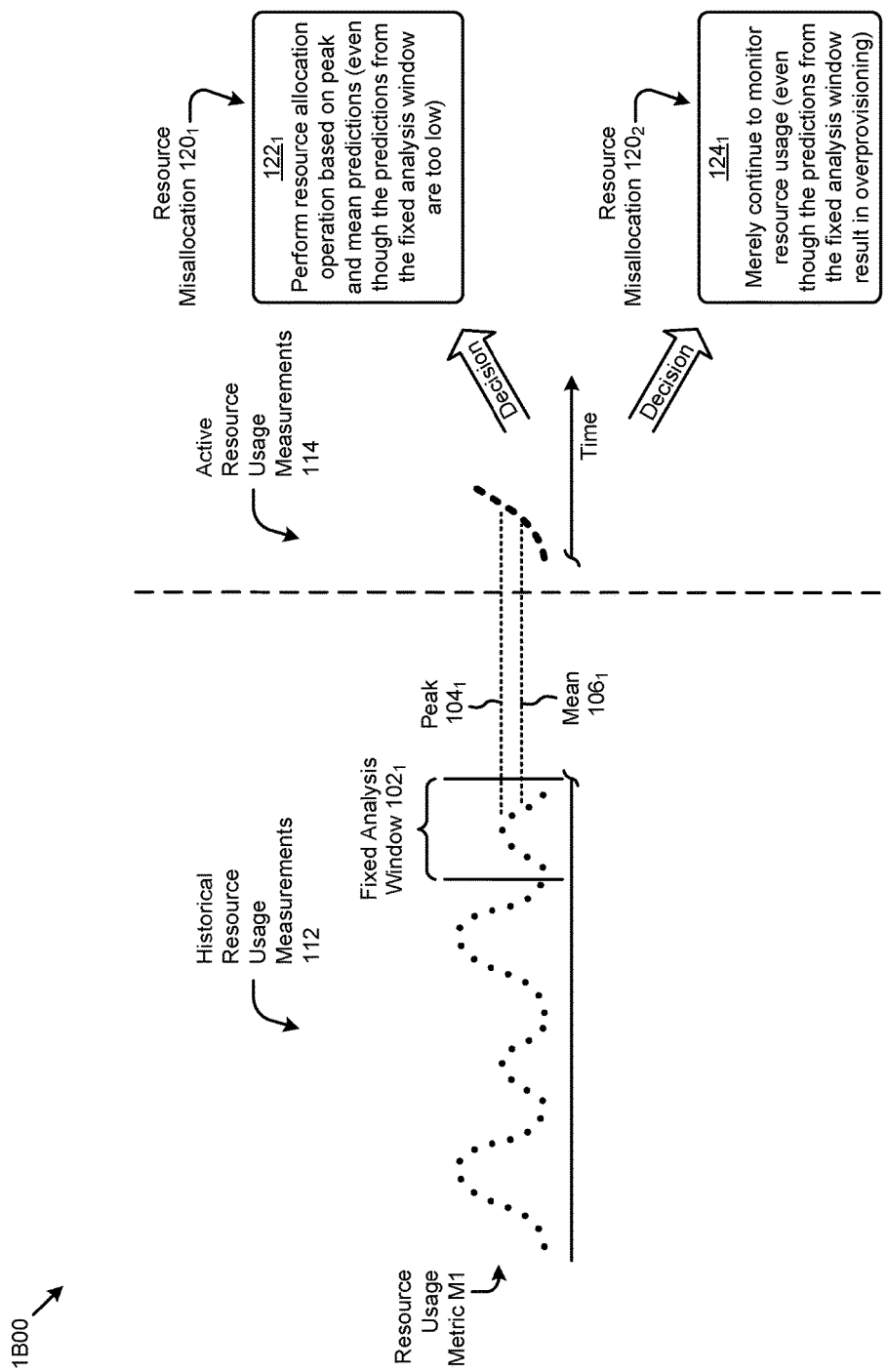
FIG. 1B illustrates a distributed scheduling technique.

FIG. 1B illustrates a distributed scheduling technique 1B00. The distributed scheduling technique 1B00 illustrates one approach to distributed scheduling (DS) based on static threshold values derived from a fixed analysis window of historical resource usage measurements. Specifically, a set of historical resource usage measurements 112 for resource usage metric M1 and resource usage metric M2 are shown. As used herein, a resource usage metric is a unit of measurement used to characterize a certain aspect of resource usage in, for example, a distributed virtualization system or any other computing system. Resource usage metrics can be used to characterize the resource usage of a given system to, for example, maximize the performance of the system. Such resource usage metrics might serve to measure CPU capacity usage, storage capacity usage, bandwidth capacity usage, I/O (input/output or IO) contention, latency, and/or any other metrics. The historical resource usage measurements are the earlier collected measurements pertaining to the resource usage metrics.

Referring again to FIG. 1B, distributed scheduling technique 1B00 might analyze a portion of the historical measurements pertaining to resource usage metric M1 corresponding to a fixed analysis window $102_1$ to determine a peak threshold value (e.g., peak $104_1$) and a mean threshold value (e.g., mean $106_1$). An analysis window is a bounded period of time comprising data to be included in some analysis, such as a statistical analysis to determine a maximum (e.g., peak) value and/or mean value from the set of data in the analysis window. In this case, the analysis window is "fixed" by, for example, a predetermined setting (e.g., 24 hours, 1 week, etc.). As can be observed, the fixed analysis window $102_1$ does not capture a sufficient number of historical measurements to characterize the dynamic behavior of resource usage metric M1.

More specifically, the peak and mean threshold values derived from a larger sample of historical measurements (e.g., to capture an entire cycle of periodicity) would be higher as compared to peak $104_1$ and mean $106_1$, respectively. In this case, the shown set of active resource usage measurements 114 captured for resource usage metric M1 will breach at least the threshold corresponding to peak $104_1$. Such active resource usage measurements are measurements corresponding to resource metrics collected at a later moment in time (e.g., later in time as compared to the moments in time corresponding to the acts of collection of distributed storage system historical resource usage measurements).

A resource allocation function might make a decision based on the fixed-window-based peak and mean. There are at least two deficient decisions that can come about when using the fixed-window-based peaks and means. In one case, a resource allocation operation might be performed using peaks and means in the resource allocation decision-making (operation $122_1$), resulting in a likelihood that the actual usage will far exceed the predicted usage. For example, a resource allocation operation might be invoked to facilitate migrating a container, migrating a virtual machine, adding a node, adding storage capacity, and/or any other resource allocation operation. Since the peak and mean from the fixed analysis window $102_1$ are deficient in characterizing the dynamic behavior of resource usage metric M1 (e.g., the usage prediction is most likely too low), the foregoing resource allocation operation may result in a resource misallocation $120_1$. As shown, the peak $104_1$ is lower that would be predicted to occur if periodicity were included in the prediction rather than reliance on the fixed analysis window $102_1$. Indeed, if the periodicity of resource usage metric M1 were to reoccur in the future time period as was true in the historical time period, then the demand for that resource would be much greater than predicted, resulting in resource misallocation $120_2$. In this form of a resource misallocation, rather than pursue a reallocation approach so as to avoid overprovisioning, continued usage might merely be monitored (operation $124_1$), thus risking allocation of resources to processing entities that are predicted to not need such overprovisioned resources.

In another case, a resource misallocation using the distributed scheduling technique 1B00 can result when a fixed analysis window is too wide (e.g., arbitrarily long (such as a wide window going backwards through all stored history). For example, if a fixed analysis window is arbitrarily determined and then applied to the historical measurements pertaining to resource usage metric, the peak mean might be "too high" as compared to a peak and mean as would be determined based on periodicity.

Resource allocation decisions based on peaks and means that are "too high" may be wasteful, at least in that more resources are demanded (e.g., wastefully) than would be the case if peaks and means based on the historical periodicity were used. More specifically, the peak and mean values that might be taken from a wider, but still fixed analysis window are deficient in characterizing the dynamic behavior of resource usage metrics (e.g., the usage prediction from the wider, but still fixed analysis window is most likely "too high").

Figure 1C:
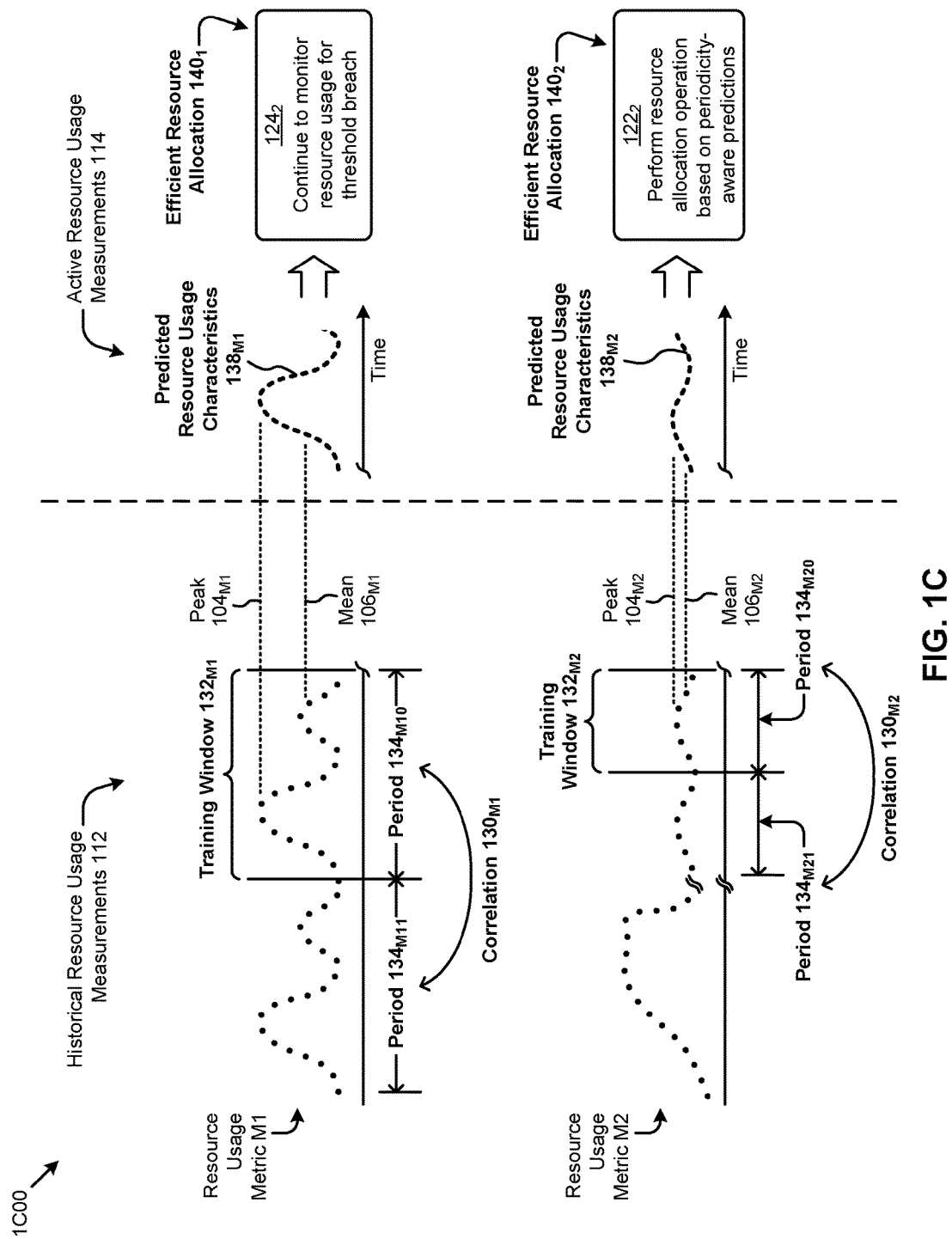
FIG. 1C illustrates a periodicity-aware resource distribution technique as implemented in systems for dynamic resource distribution using periodicity-aware predictive modeling, according to some embodiments.

Improvements to the foregoing fixed analysis window techniques and solutions to various technical problems pertaining to the use of fixed-length or arbitrary-length analysis windows when determining resource allocation in a distributed virtualization environment are addressed hereunder as shown and described in FIG. 1C.

FIG. 1C illustrates a periodicity-aware resource distribution technique 1C00 as implemented in systems for dynamic resource distribution using periodicity-aware predictive modeling. As an option, one or more variations of periodicity-aware resource distribution technique 1C00 or any aspect thereof may be implemented in the context of the architecture and functionality of the embodiments described herein. The periodicity-aware resource distribution technique 1C00 or any aspect thereof may be implemented in any environment.

The periodicity-aware resource distribution technique 1C00 illustrates an implementation of the herein disclosed techniques as applied to the historical resource usage measurements 112 and active resource usage measurements 114 for resource usage metric M1 and resource usage metric M2. Specifically, and as shown, a peak threshold value (e.g., peak $104_{M1}$) and a mean threshold value (e.g., mean $106_{M1}$) are derived from the portion of the historical resource usage measurements corresponding to a training window $132_{M1}$. The measurements contained in the training window $132_{M1}$ can also be used to train a predictive model so as to produce a set of predicted resource usage characteristics $138_{M1}$. A training window (e.g., training window $132_{M1}$) is a bounded period of time comprising data to be included in some analysis, such as statistics calculations (e.g., peak value, mean value, etc.) or predictive model training. In this case, the training window is dynamically determined according to the herein disclosed techniques such that the bounds of the training window is determined in a periodicity-aware manner. The semantics of being periodicity-aware corresponds to a knowledge (e.g., or determination, or awareness) of a quality or characteristic that is periodically recurring. Specifically, training window $132_{M1}$ is determined based at least in part on the periodicity in the historical measurements for resource usage metric M1.

More specifically, the herein disclosed techniques can be implemented to discover a correlation $130_{M1}$ between the set of measurements in a period $134_{M10}$ and the set of measurements in a period $134_{M11}$, where period $134_{M11}$ is the same duration as period $134_{M10}$. The correlation $130_{M1}$ indicates that the historical behavior of resource usage metric M1 is periodically recurring with a period of period $134_{M10}$.

The active resource usage measurements 114 for metric M1 can be compared to the peak $104_{M1}$, the mean $106_{M1}$, and the predicted resource usage characteristics $138_{M1}$ derived from the periodicity-aware training window to determine the resource allocation operations, if any, that can be executed to improve resource usage efficiency. Strictly as an example, the foregoing comparison might indicate that no resource allocation action be taken, and that resource usage metric M1 continue to be monitored for any threshold breaches (operation $124_2$). Since the dynamically determined training window sufficiently captures a full period of the periodic behavior of the resource usage metric M1, taking no action to reallocate resources can be considered an efficient resource allocation $140_1$. In this example, as can be observed, the active resource usage measurements 114 remain below the predicted resource usage characteristics $138_{M1}$ (e.g., below the peak threshold value shown as peak $104_{M1}$).

As another example, and as shown, a peak threshold value (e.g., peak $104_{M2}$) and a mean threshold value (e.g., mean $106_{M2}$) are derived from the portion of the historical resource usage measurements 112 for resource usage metric M2 corresponding to a training window $132_{M2}$. The measurements contained in the training window $132_{M2}$ can also be used to train a predictive model so as to produce a set of predicted resource usage characteristics $138_{M2}$. Training window $132_{M1}$ is periodicity-aware as indicated by its relationship with period $134_{M20}$, which in turn is correlated to period $134_{M21}$ by correlation $130_{M2}$. Specifically, the herein disclosed techniques can be implemented to discover the correlation 130 between the set of measurements in period $134_{M20}$ and the set of measurements in period $134_{M21}$, where period $134_{M21}$ is the same duration as period $134_{M20}$. The correlation 130 indicates that the historical behavior of resource usage metric M2 is periodically recurring with a periodicity of period $134_{M20}$. Aligning the training window 132 to the period corresponding to period $134_{M20}$ and period $134_{M21}$ facilitates capturing the dynamic behavior of metric M2 in the measurements corresponding to the training window $132_{M2}$.

The active resource usage measurements 114 for metric M2 can be compared to the peak $104_{M2}$, the mean $106_{M2}$, and the predicted resource usage characteristics $138_{M2}$ derived from the periodicity-aware training window to determine the resource allocation operations, if any, that can be executed to improve resource usage efficiency. Specifically, in this example, a future resource usage comparison might indicate that a resource allocation action should be taken based on the peak threshold breach (operation $122_2$). Since the dynamically determined training window sufficiently captures a full period of the periodic behavior of the resource usage metric M2, taking an action to reallocate (e.g., relocate the resource demand to another location with greater resource availability) can improve resource fitting of resource demands to resource availability, as depicted as the shown efficient resource allocation $140_2$.

Figure 1D:
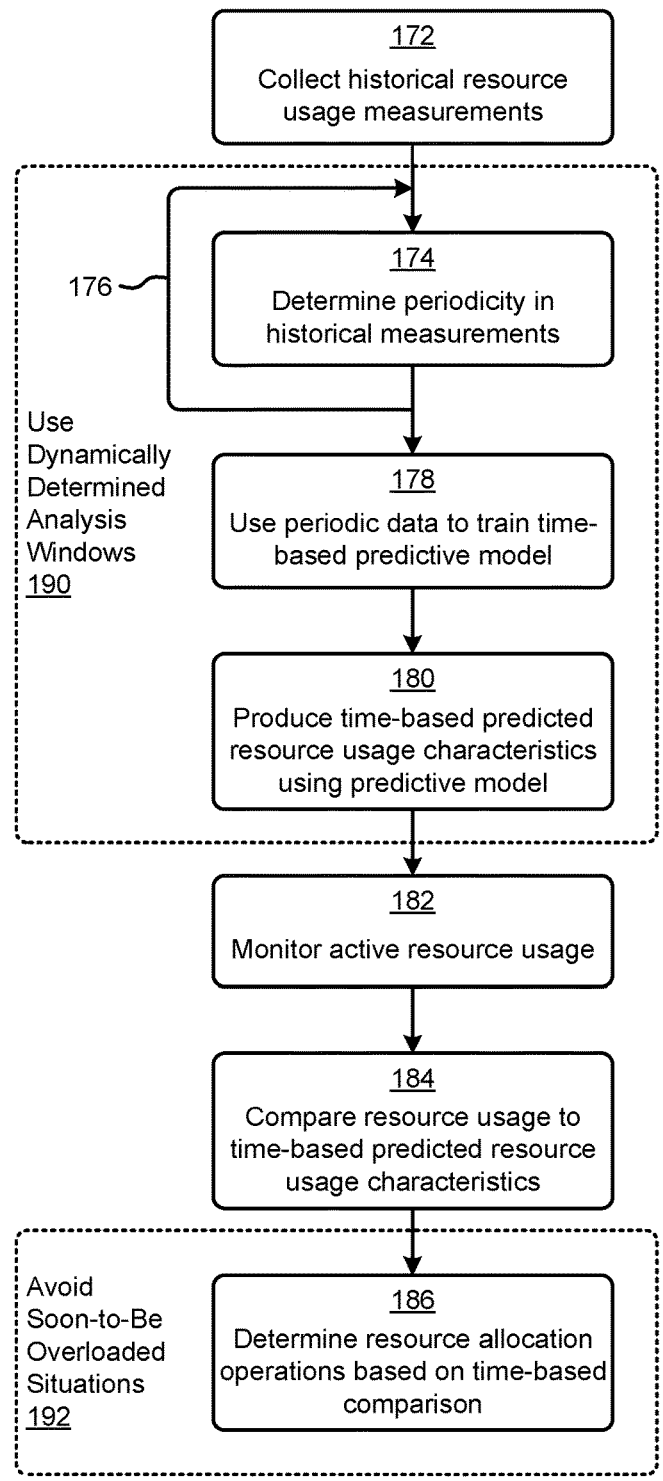
FIG. 1D illustrates a periodicity-aware resource allocation technique as implemented in systems for dynamic resource distribution using periodicity-aware predictive modeling, according to some embodiments.

Further details pertaining to the distributed scheduling technique 1B00 and the periodicity-aware resource distribution technique 1C00 are shown and described as pertains to FIG. 1D. Such techniques serve to (1) capture the dynamic behavior such as periodicity or seasonality, (2) minimize false alarms and false positives, and (3) aid in efficient resource allocation in highly dynamic distributed systems.

FIG. 1D illustrates a periodicity-aware resource allocation technique 1D00 as implemented in systems for dynamic resource distribution using periodicity-aware predictive modeling. As an option, one or more variations of periodicity-aware resource allocation technique 1D00 or any aspect thereof may be implemented in the context of the architecture and functionality of the embodiments described herein. The periodicity-aware resource allocation technique 1D00 or any aspect thereof may be implemented in any environment.

The periodicity-aware resource allocation technique 1D00 presents one embodiment of certain steps for facilitating dynamic resource distribution using periodicity-aware predictive modeling according to the herein disclosed techniques. Specifically, periodicity-aware resource allocation technique 1D00 can commence with collecting a set of historical resource usage measurements (step 172). For example, the historical measurements might pertain to one or more resource usage metrics, such as CPU usage, storage usage, and/or any other metrics. The herein disclosed techniques can be implemented to determine a periodicity in the historical measurements (step 174). For example, the measurements for each resource usage metric can be analyzed to determine the periodicity for the particular metric. In some embodiments, determining the periodicity can be an iterative process, as depicted by the loop 176. The periodic data for each metric can then be used to train a respective time-based predictive model (step 178).

For example, one or more time periods comprising respective instances of the periodic data can correspond to one or more instances of a training window for training the time-based predictive model. A predictive model is a collection of mathematical techniques (e.g., algorithms) that facilitate predicting a set of outputs (e.g., outcomes, responses) based on a set of inputs (e.g., stimuli). In some cases, the mathematical techniques might comprise a set of equations having coefficients that relate one or more of the input variables to one or more of the output variables. In these cases, the equations and coefficients are determined by the training process. A time-based predictive model is a predictive model having a unit of time as one of its input and/or output variables. For example, one embodiment of a time-based predictive model implemented by the herein disclosed techniques can predict a resource usage metric value for a given moment in time over a sequence of moments in time. In some cases, the set of predicted outputs can be bounded by a confidence interval which corresponds to a confidence level (e.g., 95%) pertaining to the quality of the estimates of the unknown parameter (e.g., resource usage metric) provided by the set of predicted outputs. Further details related to predictive models are shown and described herein and specifically as pertaining to FIG. 3A, FIG. 3B, and FIG. 3C.

Referring again to periodicity-aware resource allocation technique 1D00 in FIG. 1D, can be used to determine periodicity in historical measurements and train the predictive model (step 174 and step 178). The predictive model can be used to produce a set of predicted resource usage characteristics (step 180). The predicted resource usage characteristics can comprise a time-based series of predicted values (e.g., vectors) for various resource usage metrics. In some cases, statistical values, such as a peak value or a mean value, can be forecasted using the predictive model. The foregoing steps use dynamically-determined analysis windows 190 rather than static or fixed analysis windows.

Use of dynamically-determined analysis windows in forecasting is more likely to accurately predict resource usage. A high degree of confidence in proposing allocation operations, making allocation decisions, and/or performing allocation operations can be garnered by monitoring then-current or recently occurring active resource usages of candidate target nodes (step 182) and comparing them to the time-based predicted resource usage characteristics (step 184) to determine confidence values, which in turn can be used to propose one or more resource allocation operations (step 186). Confidence values can be calculated using any known techniques, possibly including the number of measurements taken and/or the duration of the time period over which the measurements were taken.

In some use cases a virtual machine is moved from one node to another node based on a forecast. The herein-disclosed techniques serve to avoid soon-to-be-overloaded situations. As an example, an initially-proposed (and then rejected) resource allocation operation might determine to move VM123 to AccountingNode1023 based on the predicted peaks and means pertaining to VM123. However, using the then-occurring resource usage measurements and/or any observed periodicity pertaining to AccountingNode1023, step 186 can determine that moving VM123 to AccountingNode1023 at that moment in time would add the load of VM123 to a node that is already, or predictably soon to be, heavily loaded. Thresholds and/or limits can be imposed over resource allocation operations such that time-based resource allocation proposals (e.g., as in step 186) can avoid soon-to-be overloaded situations 192.

The periodicity-aware resource allocation technique 1D00 as implemented by the herein disclosed techniques facilitates efficient resource allocation in distributed virtualization systems by accounting for the dynamic behavior (e.g., periodicity, seasonality, etc.) of the system's resource usage in a set of time-based predicted resource usage characteristics produced by predictive models. One implementation of various system components and/or interactions for facilitating the foregoing periodicity-aware resource allocation technique and/or other herein disclosed techniques is shown and described as pertaining to FIG. 2A.

Figure 2A:
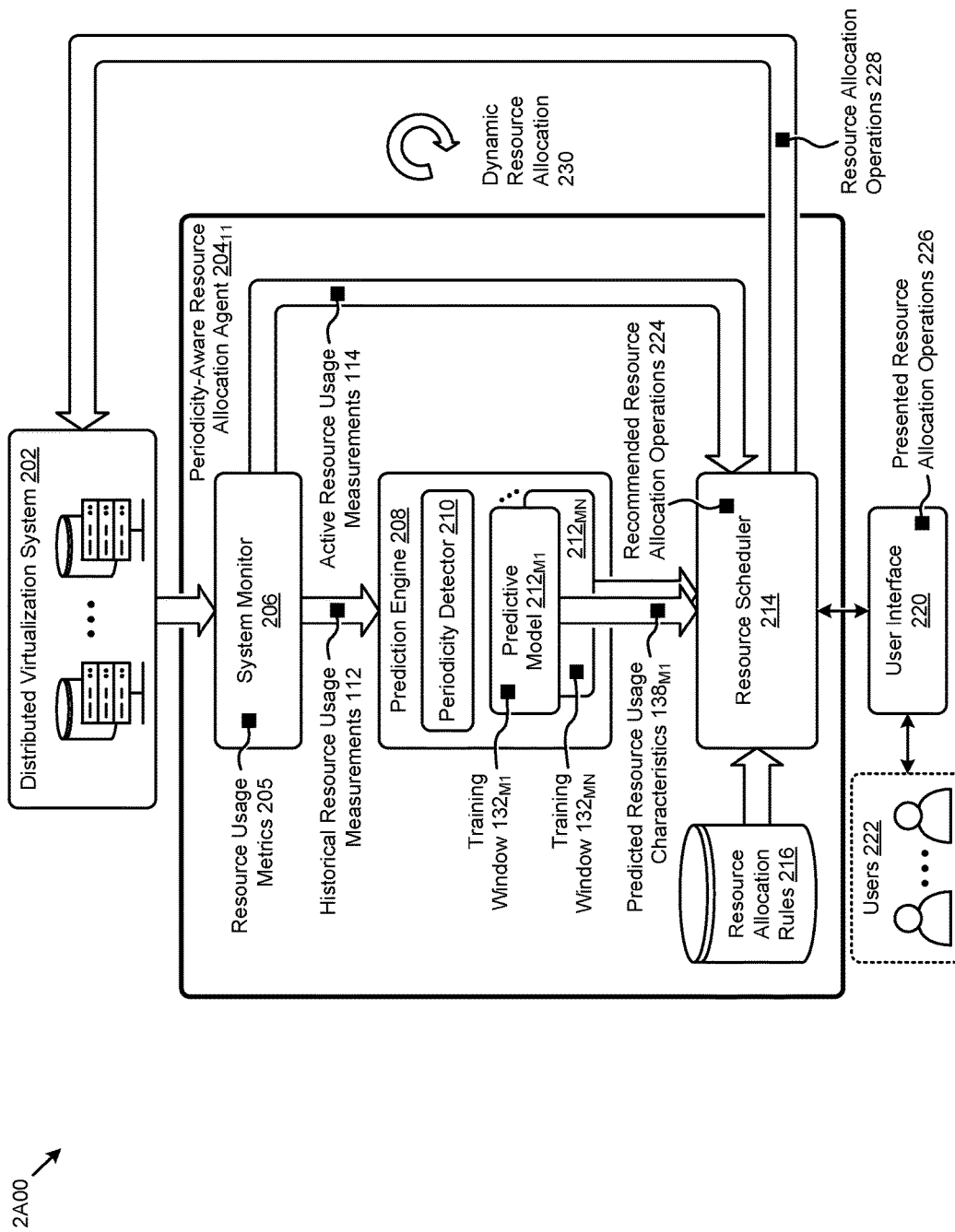
FIG. 2A depicts component interconnections and architectures used for dynamic resource distribution using periodicity-aware predictive modeling, according to an embodiment.

FIG. 2A depicts component interconnections and architectures 2A00 used for dynamic resource distribution using periodicity-aware predictive modeling. As an option, one or more variations of architectures 2A00 or any aspect thereof may be implemented in the context of the architecture and functionality of the embodiments described herein. The architectures 2A00 or any aspect thereof may be implemented in any environment.

The embodiment shown in FIG. 2A comprises a representative distributed system (e.g., distributed virtualization system 202) that interacts with a periodicity-aware resource allocation agent $204_{11}$ to receive a set of resource allocation operations 228 for facilitating dynamic resource distribution using periodicity-aware predictive modeling according to the herein disclosed techniques. As shown, periodicity-aware resource allocation agent $204_{11}$ comprises a system monitor 206 to collect various measurements of a set of resource usage metrics 205 used to measure various aspects of the usage of resources in the distributed virtualization system 202. Such measurements collected at system monitor 206 can be categorized as historical resource usage measurements 112 or active resource usage measurements 114, as earlier defined. A prediction engine 208 at the periodicity-aware resource allocation agent $204_{11}$ can use the historical resource usage measurements 112 to generate one or more predictive models (e.g., predictive model $212_{M1}$, . . . , predictive model $212_{MN}$). For example, a predictive model might be generated for each of the resource usage metrics 205 (e.g., M1, . . . , MN). A periodicity detector 210 at the prediction engine 208 can facilitate capturing the periodically-recurring behavior of the metrics in the predictive models by dynamically determining the training window (e.g., training window $132_{M1}$, . . . , training window $132_{MN}$) for each respective predictive model. For example, a given training window can correspond to a time period comprising a set of periodic data for the respective resource usage metric as determined by periodicity detector 210.

Various sets of predicted resource usage characteristics (e.g., selected from the predicted resource usage characteristics $138_{M1}$) of the predictive models can be received at a resource scheduler 214 to determine one or more recommended resource allocation operations 224. Active resource usage measurements 114 from system monitor 206 can be used to determine one or more of the recommended resource allocation operations 224. Certain instances of resource allocation rules 216 can also be used to determine one or more of the recommended resource allocation operations 224. For example, a resource allocation rule can be applied to a predicted resource usage metric to generate a threshold to compare to an active resource usage measurement. A breach of such a threshold can produce and/or generate a resource allocation operation. In some cases, the resource allocation operation generated can be defined in the resource allocation rules 216. In certain cases, one or more of the recommended resource allocation operations 224 can be automatically issued as one or more of the resource allocation operations 228 to the distributed virtualization system 202 for execution. The resource scheduler 214 can continuously receive updated inputs (e.g., predicted resource usage characteristics, active resource usage measurements, resource allocation rules, etc.) to, in turn, continuously generate resource allocation operations to facilitate a dynamic resource allocation 230. In other cases, any or all of the recommended resource allocation operations 224 can be presented to one or more users (e.g., users 222) in a user interface 220. The presented resource allocation operations 226 can be viewed by user 222 to facilitate selection of certain instances of the presented resource allocation operations 226 for execution at the distributed virtualization system 202.

The components, data flows, and data structures shown in FIG. 2A presents merely one partitioning and associated data manipulation approach. The specific example shown is purely exemplary, and other subsystems and/or partitionings are reasonable. One embodiment of an environment depicting such systems, subsystems, and/or partitionings is shown and described as pertaining to FIG. 2B.

Figure 2B:
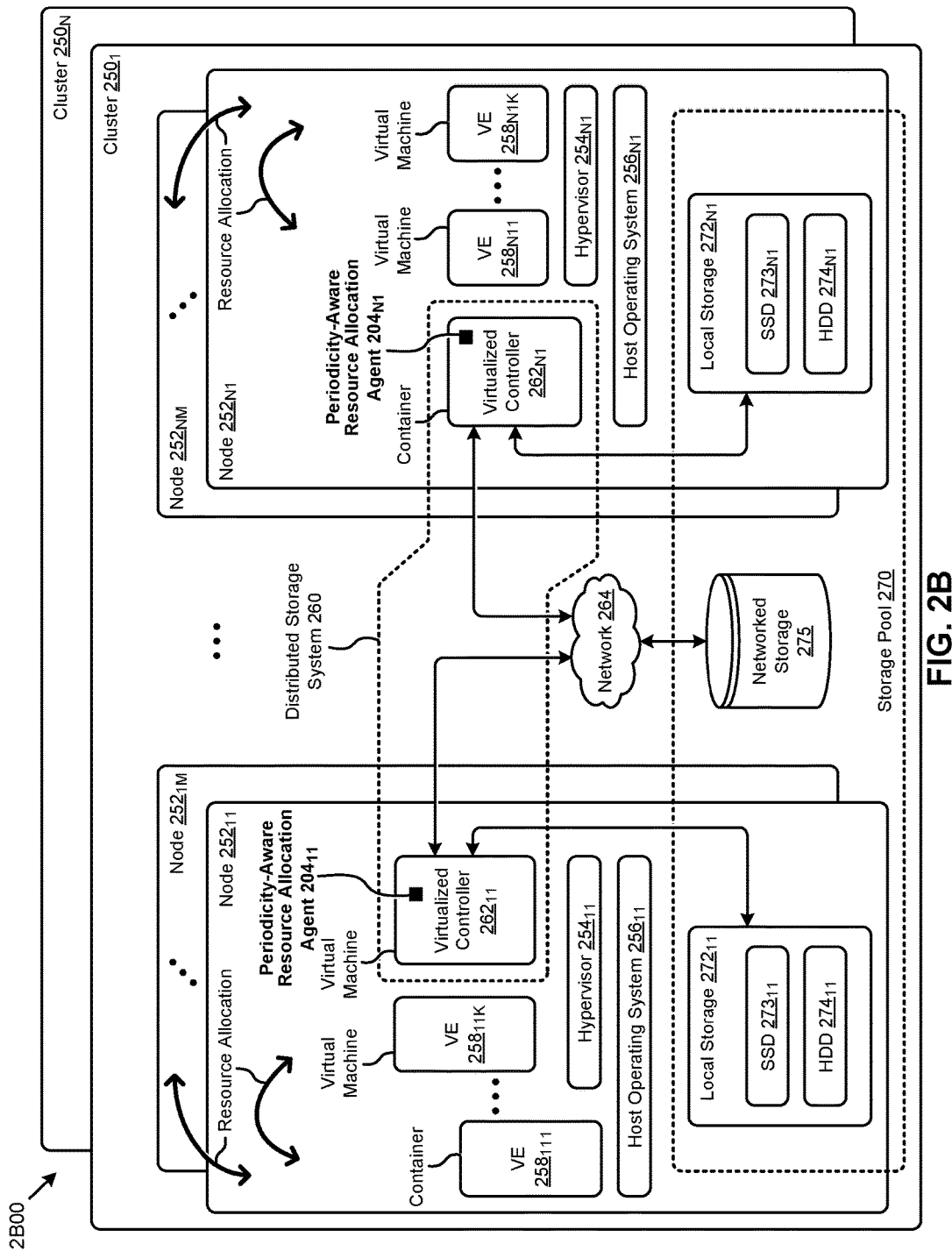
FIG. 2B depicts a distributed virtualization environment in which embodiments of the present disclosure can operate.

FIG. 2B depicts a distributed virtualization environment 2B00 in which embodiments of the present disclosure can operate. As an option, one or more variations of distributed virtualization environment 2B00 or any aspect thereof may be implemented in the context of the architecture and functionality of the embodiments described herein. The distributed virtualization environment 2B00 or any aspect thereof may be implemented in any environment.

The distributed virtualization environment 2B00 shows various components associated with one instance of a distributed virtualization system (e.g., hyperconverged distributed system) comprising a distributed storage system 260 that can be used to implement the herein disclosed techniques. Specifically, the distributed virtualization environment 2B00 comprises multiple clusters (e.g., cluster $250_1$, . . . , cluster $250_N$) comprising multiple nodes (e.g., node $252_{11}$, . . . , node $252_{1M}$, node $252_{N1}$, . . . , node $252_{NM}$) that have multiple tiers of storage in a storage pool 270. For example, each node can be associated with one server, multiple servers, or portions of a server. The nodes can be associated (e.g., logically and/or physically) with the clusters. As shown, the multiple tiers of storage include storage that is accessible through a network 264, such as a networked storage 275 (e.g., a storage area network or SAN, network attached storage or NAS, etc.). The multiple tiers of storage further include instances of local storage (e.g., local storage $272_{11}$, . . . , local storage $272_{N1}$). For example, the local storage can be within or directly attached to a server and/or appliance associated with the nodes. Such local storage can include solid state drives (SSD $273_{11}$, . . . , SSD $273_{N1}$), hard disk drives (HDD $274_{11}$, . . . , HDD $274_{N1}$), and/or other storage devices.

As shown, the nodes in distributed virtualization environment 2B00 can implement one or more user virtualized entities (e.g., VE $258_{111}$, . . . , VE $258_{11K}$, . . . , VE $258_{N11}$, . . . , VE $258_{N1K}$), such as virtual machines (VMs) and/or containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $256_{11}$, . . . , host operating system $256_{N1}$), while the VMs run multiple applications on various respective guest operating systems. Such flexibility can be facilitated at least in part by a hypervisor (e.g., hypervisor $254_{11}$, . . . , hypervisor $254_{N1}$), which hypervisor is logically located between the various guest operating systems of the VMs and the host operating system of the physical infrastructure (e.g., node).

As an example, hypervisors can be implemented using virtualization software (e.g., VMware ESXi, Microsoft Hyper-V, RedHat KVM, Nutanix AHV, etc.) that includes a hypervisor. In comparison, the containers (e.g., application containers or ACs) are implemented at the nodes in an operating system virtualization environment or container virtualization environment. The containers comprise groups of processes and/or resources (e.g., memory, CPU, disk, etc.) that are isolated from the node host computer and other containers. Such containers directly interface with the kernel of the host operating system (e.g., host operating system $256_{11}$, . . . , host operating system $256_{N1}$) with, in most cases, no hypervisor layer. This lightweight implementation can facilitate efficient distribution of certain software components, such as applications or services (e.g., micro-services). As shown, distributed virtualization environment 2B00 can implement both a hypervisor-assisted virtualization environment and a container virtualization environment for various purposes.

Distributed virtualization environment 2B00 also comprises at least one instance of a virtualized controller to facilitate access to storage pool 270 by the VMs and/or containers.

As used in these embodiments, a virtualized controller is a collection of software instructions that serve to abstract details of underlying hardware or software components from one or more higher-level processing entities. A virtualized controller can be implemented as a layer (e.g., such as a hypervisor) or as a container (e.g., a Docker container).

Multiple instances of such virtualized controllers can coordinate within a cluster to form the distributed storage system 260 which can, among other operations, manage the storage pool 270. This architecture further facilitates efficient scaling of the distributed virtualization system. The foregoing virtualized controllers can be implemented in distributed virtualization environment 2B00 using various techniques. Specifically, an instance of a virtual machine at a given node can be used as a virtualized controller in a hypervisor-assisted virtualization environment to manage storage and I/O activities. In this case, for example, the virtualize entities at node $252_{11}$ can interface with a controller virtual machine (e.g., virtualized controller $262_{11}$) through hypervisor $254_{11}$ to access the storage pool 270. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 260.

For example, a hypervisor at one node in the distributed storage system 260 might correspond to VMware ESXi software, and a hypervisor at another node in the distributed storage system 260 might correspond to Nutanix AHV software. As another virtualized controller implementation example, containers (e.g., Docker containers) can be used to implement a virtualized controller (e.g., virtualized controller $262_{N1}$) in an operating system virtualization environment at a given node. In this case, for example, the virtualized entities at node $252_{N1}$ can access the storage pool 270 by interfacing with a controller container (e.g., virtualized controller $262_{N1}$) through hypervisor $254_{N1}$ and/or the kernel of host operating system $256_{N1}$.

In certain embodiments, one or more instances of a periodicity-aware resource allocation agent can be implemented in the distributed storage system 260 to facilitate the herein disclosed techniques. Specifically, periodicity-aware resource allocation agent $204_{11}$ can be implemented in the virtualized controller $262_{11}$, and periodicity-aware resource allocation agent $204_{N1}$ can be implemented in the virtualized controller $262_{N1}$. Such instances of the periodicity-aware resource allocation agent can be implemented in any node in any cluster. As can be observed, the resource allocations generated by one or more instances of the periodicity-aware resource allocation agent can occur within a node (e.g., between different VMs, as shown), or between different nodes (as shown), or in some cases between clusters and/or between any resource subsystems accessible by the periodicity-aware resource allocation agents.

As earlier described, such dynamic resource allocations produced by the periodicity-aware resource allocation agent according to the herein disclosed techniques can be facilitated at least in part by one or more predictive models. Further details related to predictive models are shown and described as pertaining to FIG. 3A, FIG. 3B, and FIG. 3C.

Figure 3A:
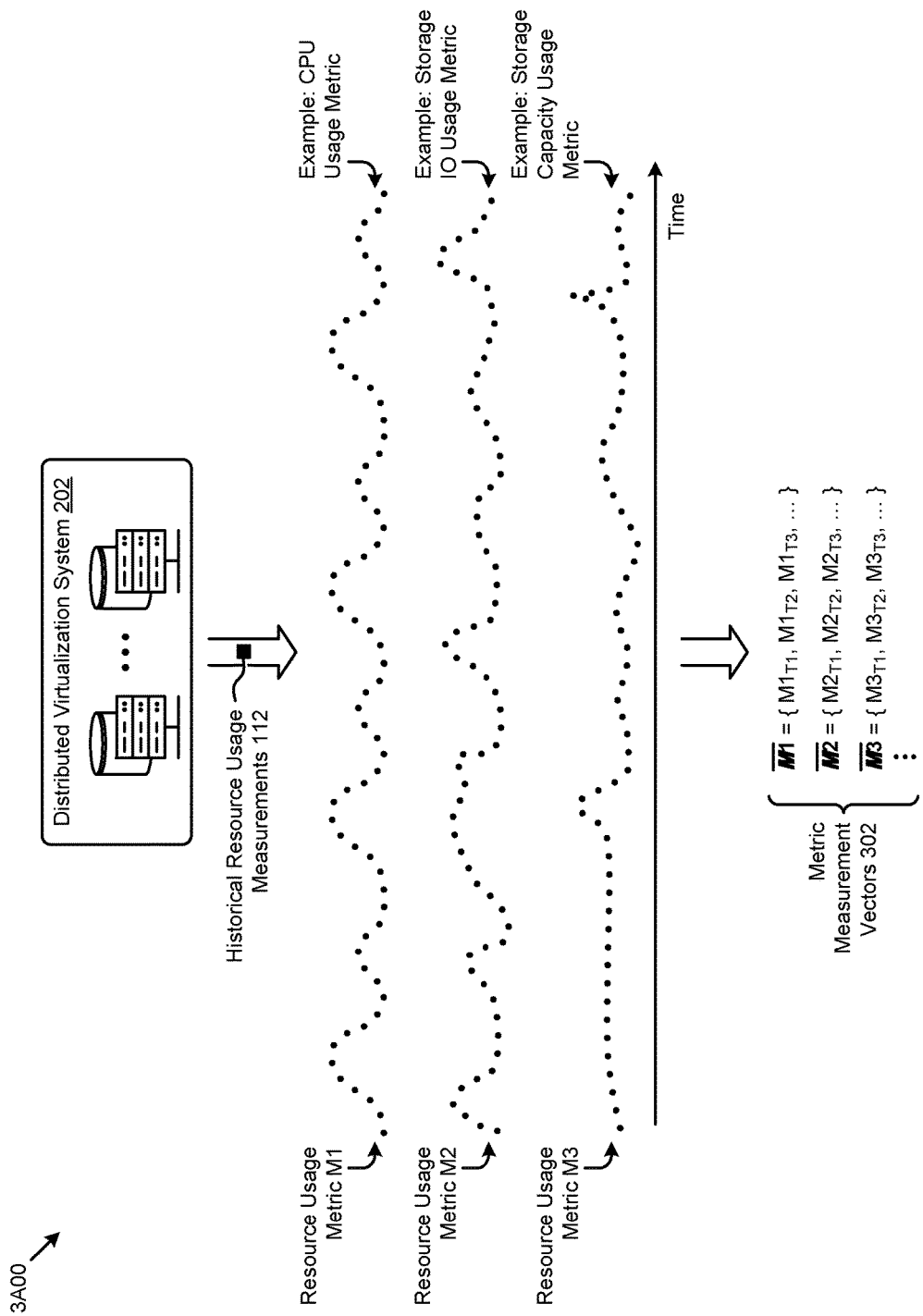
FIG. 3A is a diagram that illustrates system measurement signals in a distributed virtualization system.

FIG. 3A is a diagram 3A00 that illustrates system measurement signals in a distributed virtualization system. As an option, one or more variations of diagram 3A00 or any aspect thereof may be implemented in the context of the architecture and functionality of the embodiments described herein. The diagram 3A00 or any aspect thereof may be implemented in any environment.

The diagram 3A00 illustrates a time-series visualization of a representative sample of historical resource usage measurements 112 associated with distributed virtualization system 202. Specifically shown are time varying signals corresponding to measurements for various resource usage metrics (e.g., resource usage metric M1, resource usage metric M2, and resource usage metric M3). The metric measurements shown in FIG. 3A and discussed herein can be formed as a sequential time-series (e.g., sequences) of data items (e.g., values, attributes, timestamps) representing various metric measurement instances. In some cases, when the time interval between data items is short (e.g., seconds or minutes) for a given sequence, a visualization plot of the sequence can appear as a continuous signal.

Figure 3B:
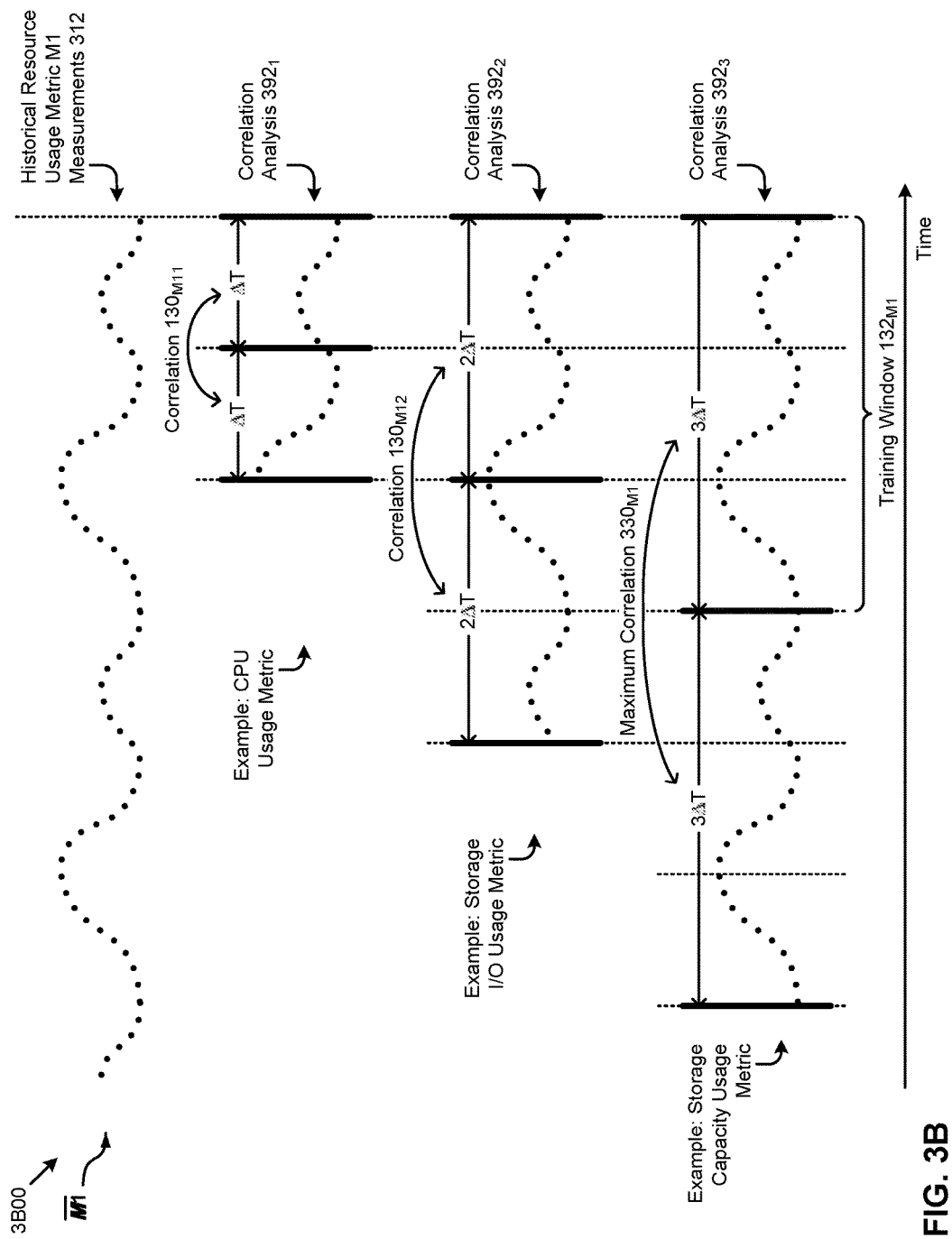
FIG. 3B presents a correlation chart showing time-based and value-based correlation techniques as used in systems for dynamic resource distribution using periodicity-aware predictive modeling, according to some embodiments.

For notational convenience, the temporal metric measurement signals can be represented as vectors, such as metric measurement vectors 302 (e.g., $\overline{M1}$, $\overline{M2}$, and $\overline{M3}$) corresponding to the metric measurements over time for a representative set of metrics. As an example, metric measurement vectors $\overline{M1}$, $\overline{M2}$, and $\overline{M3}$ might represent resource usage metrics associated with CPU usage, storage usage, and storage I/O bandwidth usage, respectively. As another example, metric measurement vectors $\overline{M1}$, $\overline{M2}$, and $\overline{M3}$ might represent a single metric (e.g., CPU usage) at various nodes (e.g., node1, node2, and node3, respectively). As shown, the resource usage measurements can be highly dynamic. In such cases, the technological solution provided by the herein disclosed techniques can be implemented to discover a periodicity in the measurements to facilitate dynamic resource distribution using periodicity-aware predictive modeling. FIG. 3B illustrates one example implementation of the technological solution.

FIG. 3B presents a correlation chart 3B00 showing time-based and value-based correlation techniques as used in systems for dynamic resource distribution using periodicity-aware predictive modeling. As an option, one or more variations of correlation chart 3B00 or any aspect thereof may be implemented in the context of the architecture and functionality of the embodiments described herein. The correlation chart 3B00 or any aspect thereof may be implemented in any environment.

Certain portions of a set of historical resource usage measurements (e.g., historical resource usage metric M1 measurements 312) in a distributed virtualization system might have an association with other portions of the historical resource usage measurements. For example, a measurement vector that is periodic can be characterized as having a high correlation between the portion of measurements comprising each respective period of the measurement vector. In certain cases, a portion of measurements comprising a time window not equivalent to the period of the periodic signal can exhibit limited correlation to another portion of measurements in an adjacent (e.g., in time) instance of the time window. Such correlations or lack of correlations can be automatically detected, and a scalar value representing the extent of correlation can be determined mathematically for any time window.

In the discussions just below, the correlation of a portion of a time-series resource usage measurement vector is considered with respect to another portion of the time-series resource usage measurement vector. Correlations can be positive (e.g., the time-series data moves in the same direction), or negative (e.g., the time-series data moves in the opposite direction), or zero (e.g., no correlation). Those skilled in the art will recognize there are many known-in-the-art techniques to correlate any pair of curves. For example, correlation can be based on a spatial distance and/or a temporal distance between data item values pertaining to the metric measurement sequence.

As shown, the historical resource usage metric M1 measurements 312 comprise the vector $\overline{M1}$. In a correlation analysis $392_1$, a time window of $\Delta T$ duration is selected. The portion of data from vector $\overline{M1}$ corresponding the time window of $\Delta T$ duration is compared to a portion of data from vector $\overline{M1}$ corresponding to an adjacent time window of $\Delta T$ duration. As can be observed visually from FIG. 3B, a correlation $130_{M11}$ between the two foregoing portions of data in time windows of $\Delta T$ duration is limited. If a time window of $2\Delta T$ duration is selected in a correlation analysis $392_2$, a correlation $130_{M12}$ between the portions of data in time windows of $2\Delta T$ duration might also be limited. A correlation analysis $392_3$ corresponds to a time window of $3\Delta T$ duration. In this case, the portion of data from vector $\overline{M1}$ corresponding to the time window of $3\Delta T$ duration might exhibit a maximum correlation $330_{M1}$ to a portion of data from vector $\overline{M1}$ corresponding to an adjacent time window of $3\Delta T$ duration. Any techniques for determining $\Delta T$ and/or for increasing or decreasing the time window for correlation analysis can be implemented. For example, $\Delta T$ might have a low limit based on the frequency of measurement samples of a given resource usage metric. As another example, a binary search for the time window corresponding to a maximum correlation can be executed for the full set of historical resource usage measurements for a given resource usage metric.

Figure 3C:
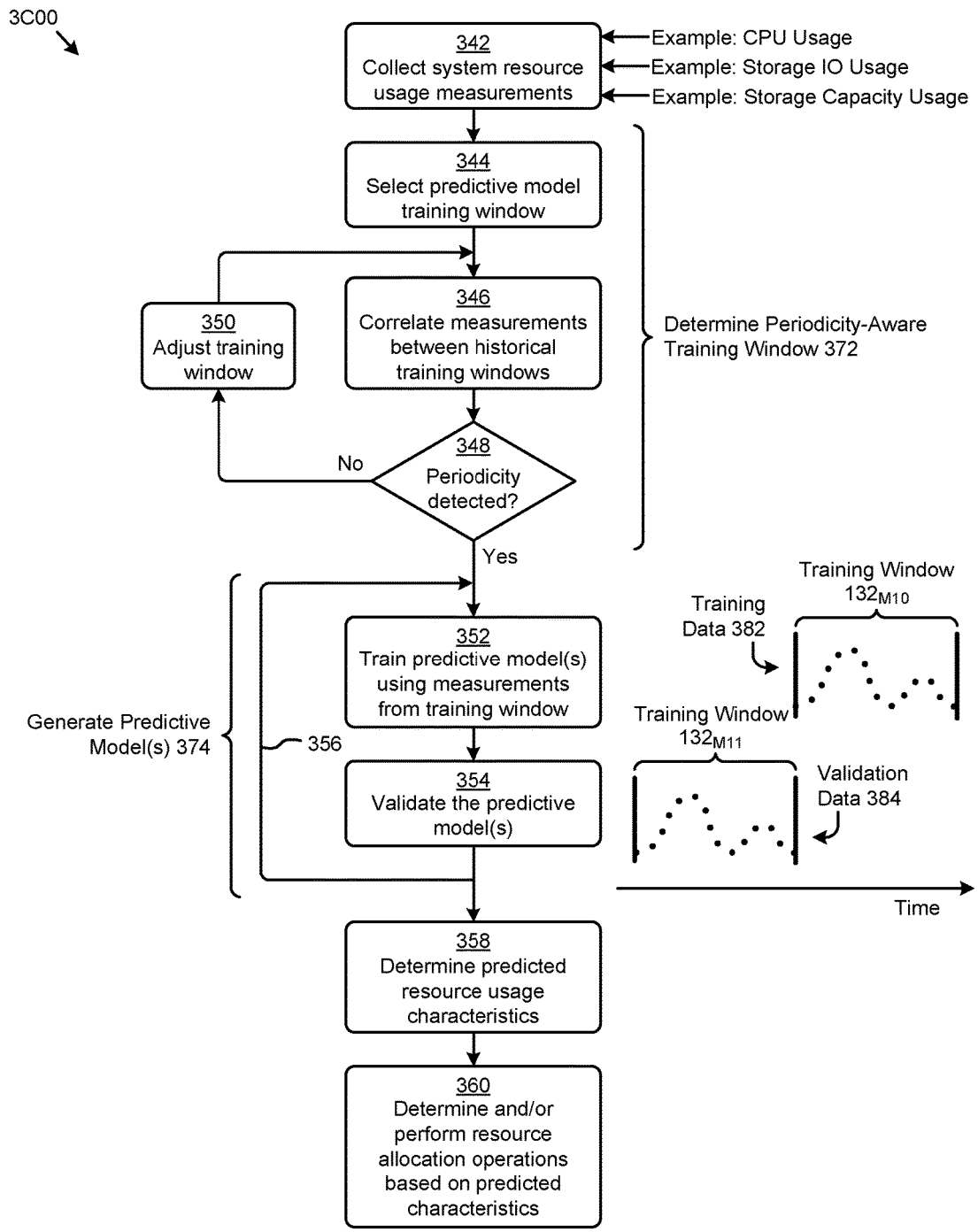
FIG. 3C presents a periodicity-aware prediction model generation technique as used in systems for dynamic resource distribution using periodicity-aware predictive modeling, according to some embodiments.

When a maximum correlation is detected, the corresponding time window can be used as the training window (e.g., training window $132_{M1}$) for generating a predictive model, as shown and described as pertaining to FIG. 3C.

FIG. 3C presents a periodicity-aware prediction model generation technique 3C00 as used in systems for dynamic resource distribution using periodicity-aware predictive modeling. As an option, one or more variations of periodicity-aware prediction model generation technique 3C00 or any aspect thereof may be implemented in the context of the architecture and functionality of the embodiments described herein. The periodicity-aware prediction model generation technique 3C00 or any aspect thereof may be implemented in any environment.

The periodicity-aware prediction model generation technique 3C00 presents certain steps for dynamically determining periodicity-aware training windows for generating predictive models to determine resource allocation operations in distributed virtualization systems according to the herein disclosed techniques. In one or more embodiments, the steps and underlying operations shown in FIG. 3C can be facilitated at least in part by an instance of the periodicity-aware resource allocation agent $204_{11}$ earlier shown and described as pertaining to FIG. 2A. Specifically, periodicity-aware prediction model generation technique 3C00 can commence with collecting various historical resource usage measurements (step 342). A training window for generating a predictive model can be selected (step 344). For example, a training window last used to generate and/or train a particular predictive model for a given resource usage metric might be selected. A correlation analysis can be performed to correlate the portion of measurements associated with one instance of the training window to another portion of measurements associated with another respective instance of the training window (step 346). If a correlation value resulting from the correlation analysis indicates a periodicity in the data for the selected training window is not detected (see "No" path of decision 348), then the training window can be adjusted (step 350). For example, the duration of the training window might be increased or decreased. The training window can continue to be adjusted until a correlation value statistically sufficient to indicate periodicity is obtained (see "Yes" path of decision 348). As can be observed, the foregoing steps, including the dynamic training window adjustment, can be implemented to determine a periodicity-aware training window (see grouping 372).

When the training window has been determined, the resource usage measurements associated with one or more instances of the training window can be used to train one or more predictive models (step 352) and validate the predictive models (step 354). For example, a predictive model might be associated with each of the resource usage metrics measured for a given system. The process of training and/or validating can be iterated (e.g., over the shown path 356) until the predictive models behave within target tolerances (e.g., with respect to predictive statistic metrics, descriptive statistics, significance tests, etc.). Specifically, for example, measurements from one instance of the training window (e.g., training window $132_{M10}$) might serve as training data 382 to train a predictive model, while measurements from another instance of the training window (e.g., training window $132_{M11}$) can serve as validation data 384 to validate the predictive model. As can be observed, the foregoing steps including the training and validation iteration path (path 356) can be implemented to generate one or more predictive models (see grouping 374). The predictive models can then be invoked to determine a set of predicted resource usage characteristics (step 358) to facilitate determining and/or performing one or more resource allocation operations according to the herein disclosed techniques (step 360).

As earlier described, in some embodiments, the resource allocation operations can be determined based at least in part on one or more resource allocation rules. Further details regarding such resource allocation rules are disclosed as related to FIG. 4.

FIG. 4 presents a data structure 400 for codifying resource allocation rules that are used in systems for dynamic resource distribution using periodicity-aware predictive modeling. As an option, one or more variations of data structure 400 or any aspect thereof may be implemented in the context of the architecture and functionality of the embodiments described herein. The data structure 400 or any aspect thereof may be implemented in any environment.

The data structure 400 depicts a tabular structure (e.g., relational database table) having rows associated with a respective resource allocation rule and columns associated with certain resource allocation rule attributes. Specifically, in some embodiments, the resource allocation rule attributes can characterize an identifier (e.g., ID), a subject metric (e.g., Metric), a condition or conditional rule (e.g., Condition), a resource allocation operation (e.g., Operation(s)), one or more constraints pertaining to the metric and/or resource allocation (e.g., Constraint(s)), a display instruction for the user interface (e.g., Display), and/or other characteristics. The expected times over which a particular allocation rule might be applied is also given in the data structure. A constraint can be used in conjunction with the indication of when to apply the rule and/or when to take remedial action in the case that the respective threshold is breached and/or in the case that rule conditions are met.

For example, resource allocation rule R24 might be triggered when storage usage exceeds 80%, and it might be checked on a daily basis (as shown). In that case, a resource allocation operation to "Release stale VMs" might be recommended and/or executed. A set of candidate VMs to be released can be displayed (e.g., to an administrator at a user interface) based on the constraint of a time the VM has been idle or powered off. For example, a list of VMs having been powered off for more than 60 days might be displayed for selection by the administrator. As another example, resource allocation rule R50 might be triggered when CPU usage exceeds 70%. In that case, a resource allocation operation to "Migrate high usage VMs" might be recommended and/or executed. A set of candidate VMs to be migrated can be displayed based on constraints pertaining to various policies, such as an affinity policy. For example, a list of VMs permitted to be migrated according to an affinity policy might be displayed for selection by the administrator.

In certain embodiments, a data storage facility (e.g., resource allocation rules 216) can be implemented to hold the aforementioned data structure for use by the herein disclosed techniques. In some cases, the resource allocation rules 216 and corresponding attributes can be selected by a user (e.g., administrator) at a user interface. In other cases, certain rules might be derived from earlier established policies. When building a resource allocation rule, the attribute selection can be based on a taxonomy to facilitate a certain consistency and/or efficacy related to various operations (e.g., applying a rule to a predictive model). The user can further interact with the user interface to facilitate execution of any of the resource allocation operations generated using the herein disclosed techniques. Embodiment of such use models pertaining to administrative interactions are shown and discussed as pertaining to FIG. 5A and FIG. 5B.

Figure 5A:
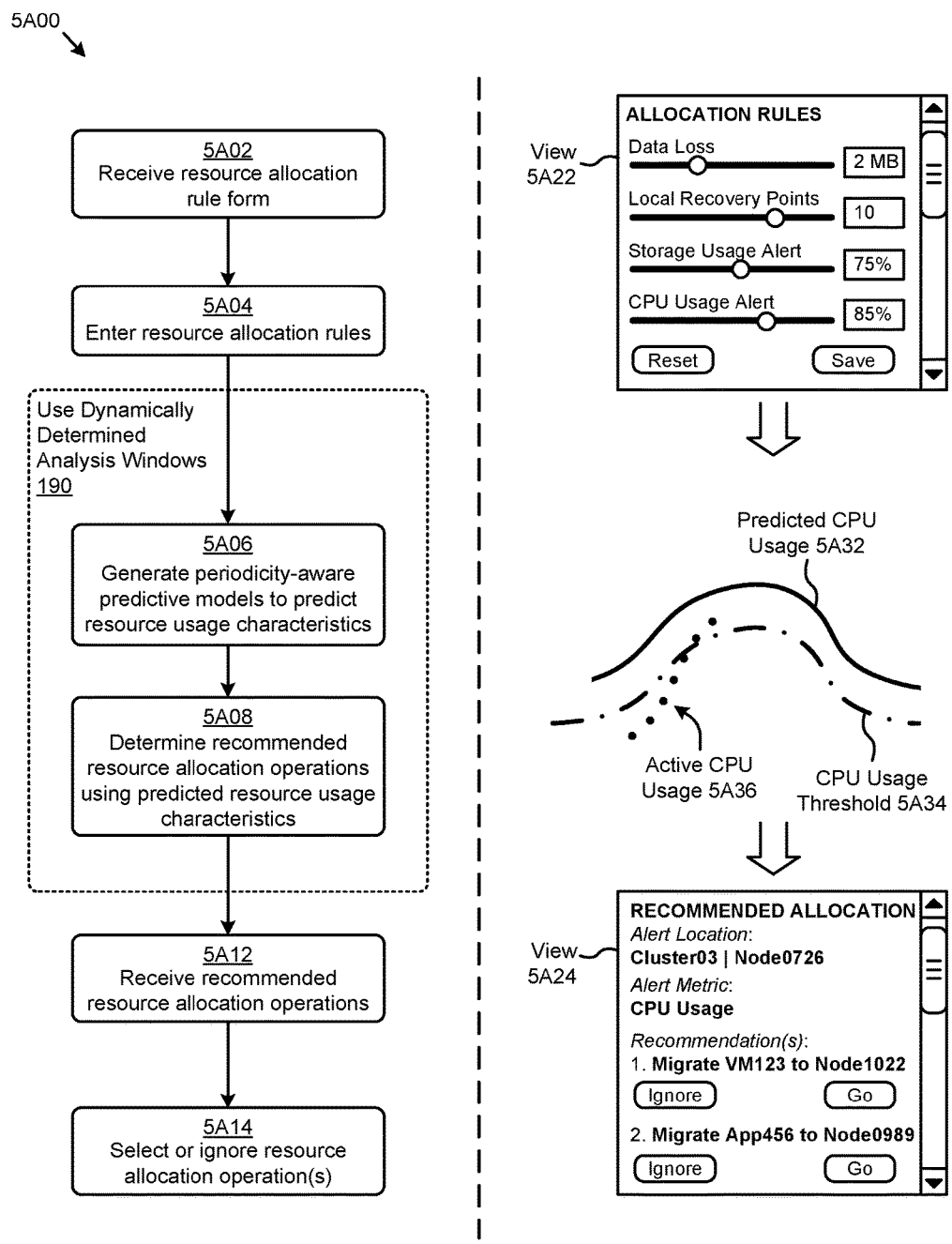
FIG. 5A and FIG. 5B depict diagrammatic representations of use models as implemented in systems for dynamic resource distribution using periodicity-aware predictive modeling, according to some embodiments.

FIG. 5A is a diagrammatic representation of a use model 5A00 as implemented in systems for dynamic resource distribution using periodicity-aware predictive modeling. As an option, one or more variations of use model 5A00 or any aspect thereof may be implemented in the context of the architecture and functionality of the embodiments described herein. The use model 5A00 or any aspect thereof may be implemented in any environment.

FIG. 5A presents one embodiment of certain steps and/or operations for facilitating dynamic resource distribution using periodicity-aware predictive modeling and user interactions, according to the herein disclosed techniques. In one or more embodiments, the steps and underlying operations shown in FIG. 5A can be facilitated at least in part by an instance of the periodicity-aware resource allocation agent $204_{11}$ earlier shown and described as pertaining to FIG. 2A. As shown, the use model can commence with a user receiving a resource allocation rule form (step 5A02). The resource allocation rule form might be a web form and/or other user interface comprising interactive components (e.g., sliders, text boxes, radial buttons, dropdown selectors, etc.).

For example, as shown in view 5A22, a user might be able to enter allocation rules related to various resource usage metrics, such as storage usage or CPU usage (step 5A04). Such allocation rules related to various resource usage metrics can be used in combination with predictive models. Specifically, using measured resource usage metrics and/or other information (e.g., historical periodicity of resource usage measurements), various predictive models can be generated to accurately predict resource periodicity-aware usage characteristics (step 5A06), which predictive models can be used in conjunction with resource allocation rules so as to perform or recommend resource allocation operations (step 5A08). In the example shown, the CPU usage alert percentage (e.g., 85%) can be applied to a predicted CPU usage 5A32 to establish a CPU usage threshold 5A34. As further shown, the CPU usage threshold 5A34 can be time-based such that the dynamic behavior of CPU usage is captured. The sequence of measurements corresponding to an active CPU usage 5A36 can be compared to CPU usage threshold 5A34 to trigger a recommendation of one or more resource allocation operations (e.g., based on the resource allocation rules). In some cases, one threshold breach can trigger a given resource allocation operation. In other cases, a logical combination of two or more threshold breaches can trigger one or more resource allocation operations.

In some cases, the recommended resource allocation operations can be received, and then presented to one or more users (step 5A12). As shown in view 5A24, a recommended allocation presented to a user might indicate the subject location (e.g., Node0726 in Cluster03) and the subject metric (e.g., CPU Usage). View 5A24 can also display recommended actions. In the example shown, the user can accept (e.g., click "Go") one or both of the recommended actions (e.g., migrate VM123 to Node1022, migrate App456 to Node0989), or the user can ignore the recommendations (step 5A14).

The range of metrics to be monitored in a system extends to any sorts of metrics that are observable and measurable. The following FIG. 5B depicts a use model where the metrics are substantially application-centric.

Figure 5B:
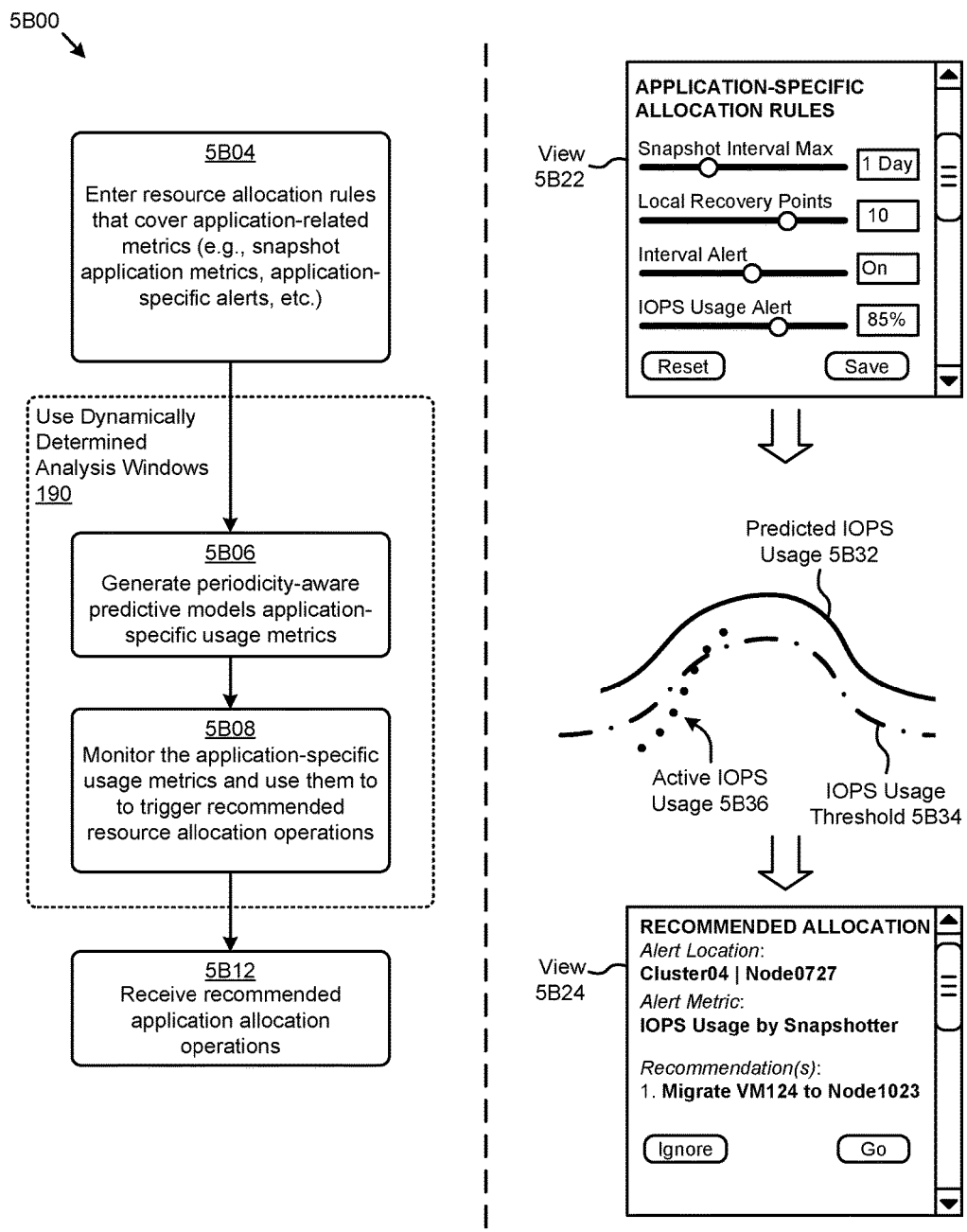

FIG. 5B is a diagrammatic representation of a use model 5B00 as implemented in systems for dynamic resource distribution using periodicity-aware predictive modeling. As an option, one or more variations of use model 5B00 or any aspect thereof may be implemented in the context of the architecture and functionality of the embodiments described herein. The use model 5B00 or any aspect thereof may be implemented in any environment.

As shown, an interactive resource allocation rule form is presented in view 5B22. The interactive resource allocation rule form includes a series of application-specific allocation rules. In the example shown, the application under consideration is a snapshot application. The metrics include a set of measurements, limits, and/or constraints that serve to capture user intent (at step 5B04) as pertaining to the application's behavior. In this example, the user-desired behavior of the snapshot application includes an intended maximum interval between successful snapshots and an intended number of local recovery points to be captured and retained. The view 5B22 also includes user-specified alert indications. Specifically, the user has indicated a desire to have an alert emitted whenever the intended interval (e.g., 1 day, as shown) is not met. The user has also indicated a desire to receive and alert if/when the storage IO operations per second (IOPS) demanded by the application exceeds 85% of the node's storage IOPS capacity.

As shown, the application-specific allocation rules serve to specify user intent pertaining to the snapshotting function. At step 5B06, the application-specific allocation rules and any measurements, limits, and/or constraints are included in a predictive model over which periodicity can be determined. The application-specific usage metrics are monitored (at step 5B08) and used to trigger resource allocation operations.

At any moment in time (e.g., upon a trigger event), a dynamically-determined analysis window can be calculated so as to calculate more accurate peaks and means. If the application-specific peaks and means as determined after considering the periodicity-aware window are breached, then alerts corresponding to the user intent are emitted, and in some cases a recommended allocation window (e.g., view 5B24) is presented to the user. In the example shown the then-current active IOPS usage 5B36 breaches the IOPS usage threshold 5B34. As depicted in this example, the breach event triggers an alert. A threshold can be defined to have a relationship (e.g., a percentage) of a predicted usage characteristic. Furthermore such a threshold can be defined as a value or function that is less than a predicted usage (e.g., less than predicted IOPS usage 5B32, as shown), or can be a value or function that is, at least at some moments in time, greater than a predicted usage.

Based on the nature of the auto-generated recommendations, a series of operations (step 5B12) for processing such recommendations is invoked. In some cases, a user interface (e.g., view 5B24) is presented to the user for user interaction. The user can accept the recommendation (e.g., using the "Go" button), or the user can ignore the recommendation (step 5A14).

Additional Embodiments of the Disclosure

Additional Practical Application Examples

Figure 6:
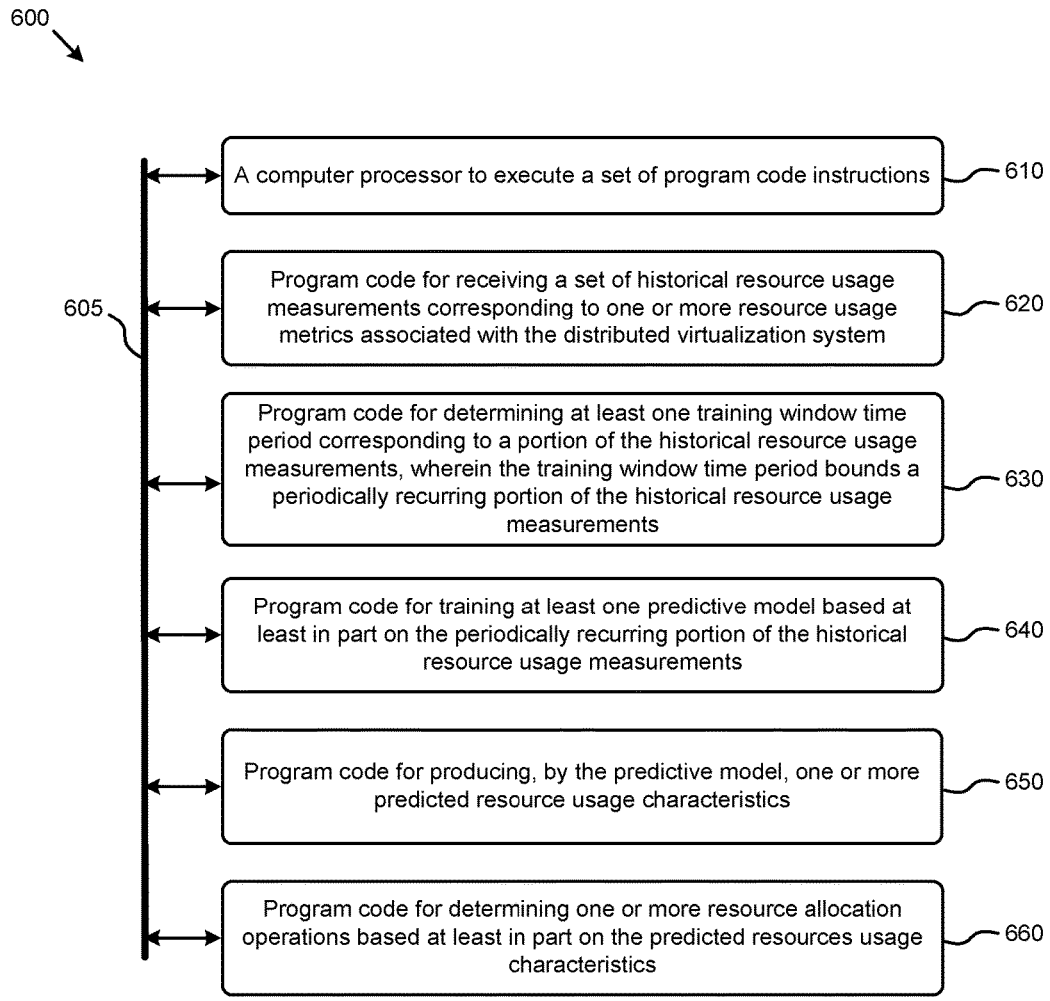
FIG. 6 depicts system components as arrangements of computing modules that are interconnected so as to implement certain of the herein-disclosed embodiments.

FIG. 6 depicts a system 600 as an arrangement of computing modules that are interconnected so as to operate cooperatively to implement certain of the herein-disclosed embodiments. This and other embodiments present particular arrangements of elements that individually, and/or as combined, serve to form improved technological processes that address accounting for seasonally-periodic resource usage characteristics when determining resource allocation in a distributed virtualization environment. The partitioning of system 600 is merely illustrative and other partitions are possible. As an option, the system 600 may be implemented in the context of the architecture and functionality of the embodiments described herein. Of course, however, the system 600 or any operation therein may be carried out in any desired environment.

The system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims.

The shown embodiment implements a portion of a computer system, presented as system 600, comprising a computer processor to execute a set of program code instructions (module 610) and modules for accessing memory to hold program code instructions to perform: receiving a set of historical resource usage measurements corresponding to one or more resource usage metrics associated with the distributed virtualization system (module 620); determining at least one training window time period corresponding to a portion of the historical resource usage measurements, wherein the training window time period bounds a periodically recurring portion of the historical resource usage measurements (module 630); training at least one predictive model based at least in part on the periodically recurring portion of the historical resource usage measurements (module 640); producing, by the predictive model, one or more predicted resource usage characteristics (module 650); and determining one or more resource allocation operations based at least in part on the predicted resources usage characteristics (module 660).

Variations of the foregoing may include more or fewer of the shown modules, and/or variations may perform more or fewer (or different) steps, and/or variations may use data elements in more or in fewer (or different) operations.

Some embodiments include variations that further comprise executing at least one of the resource allocation operations at the distributed virtualization system.

Some embodiments include variations that further comprise steps for (1) receiving a set of at least one peak resource usage measurement and at least one mean resource usage measurement, and (2) comparing the peak resource usage measurement and the mean resource usage measurement to the predicted resource usage characteristics to determine at least one of the resource allocation operations.

Some embodiments include variations that further comprise presenting at least one of the resource allocation operations to at least one user in at least one user interface.

Some embodiments include variations that further comprise selecting, by the user, the at least one of the resource allocation operations to execute at the distributed virtualization system.

Some embodiments include variations where at least one of the resource allocation operations are determined at least in part on one or more resource allocation rules.

Some embodiments include variations where the resource usage metrics pertain to at least one of, a CPU capacity usage, or a storage capacity usage.

Some embodiments include variations where the resource usage metrics pertain to at least one of, a bandwidth capacity usage, or an I/O contention, or a latency.

Some embodiments include variations where the resource allocation operations pertain to at least one of, migrating a container, or migrating a virtual machine; and some embodiments include variations where the resource allocation operations pertain to at least one of, adding a node, or adding storage capacity.

System Architecture Overview

Additional System Architecture Examples

Figure 7A:
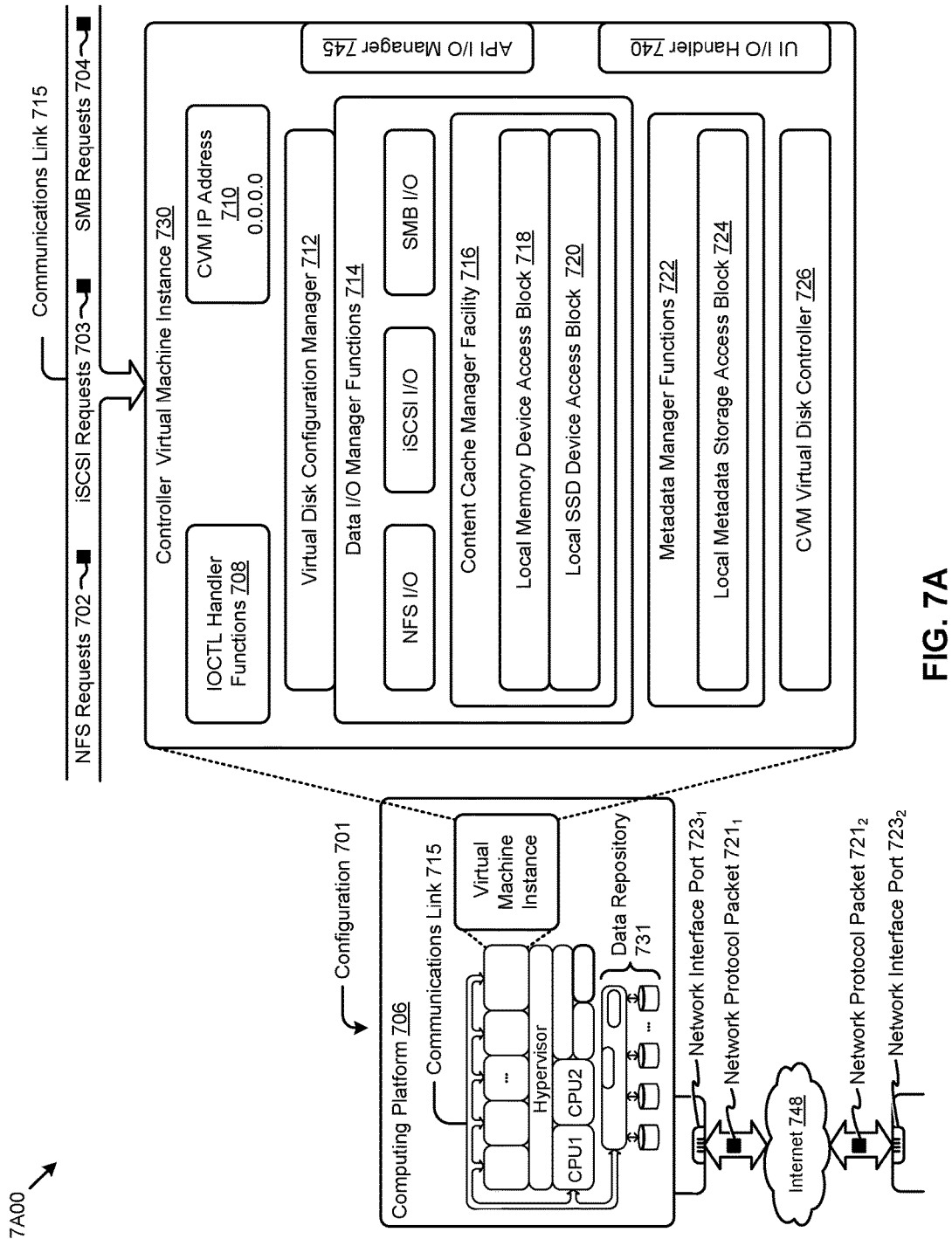
FIG. 7A and FIG. 7B depict virtualized controller architectures comprising collections of interconnected components suitable for implementing embodiments of the present disclosure and/or for use in the herein-described environments.

FIG. 7A depicts a virtualized controller as implemented by the shown virtual machine architecture 7A00. The heretofore-disclosed embodiments including variations of any virtualized controllers can be implemented in distributed systems where a plurality of networked-connected devices communicate and coordinate actions using inter-component messaging. Distributed systems are systems of interconnected components that are designed for or dedicated to storage operations as well as being designed for, or dedicated to, computing and/or networking operations. Interconnected components in a distributed system can operate cooperatively so as to serve a particular objective, such as to provide high-performance computing, high-performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates efficient use of compute and storage resources by and between the components of the distributed system. Adding a hyperconverged unit to a hyperconverged system expands the system in multiple dimensions. As an example, adding a hyperconverged unit to a hyperconverged system can expand in the dimension of storage capacity while concurrently expanding in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as containers. In some systems and/or environments, hypervisor-assisted virtualization techniques and operating system virtualization techniques are combined.

As shown, the virtual machine architecture 7A00 comprises a collection of interconnected components suitable for implementing embodiments of the present disclosure and/or for use in the herein-described environments. Moreover, the shown virtual machine architecture 7A00 includes a virtual machine instance in a configuration 701 that is further described as pertaining to the controller virtual machine instance 730. A controller virtual machine instance receives block I/O (input/output or IO) storage requests as network file system (NFS) requests in the form of NFS requests 702, and/or internet small computer storage interface (iSCSI) block IO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output (I/O or IO) can be handled by one or more IO control handler functions (e.g., IOCTL functions 708) that interface to other functions such as data IO manager functions 714 and/or metadata manager functions 722. As shown, the data IO manager functions can include communication with a virtual disk configuration manager 712 and/or can include direct or indirect communication with any of various block IO functions (e.g., NFS TO, iSCSI IO, SMB TO, etc.).

In addition to block IO functions, the configuration 701 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through the shown API IO manager 745.

The communications link 715 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 730 includes a content cache manager facility 716 that accesses storage locations, possibly including local dynamic random access memory (DRAM) (e.g., through the local memory device access block 718) and/or possibly including accesses to local solid state storage (e.g., through local SSD device access block 720).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 731, which in turn can be formatted into any one or more storage areas, and which can comprise parameterized storage accessible by a key (e.g., a filename, a table name, a block address, an offset address, etc.). An external data repository 731 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 724. The external data repository 731 can be configured using a CVM virtual disk controller 726, which can in turn manage any number or any configuration of virtual disks.

Execution of the sequences of instructions to practice certain embodiments of the disclosure are performed by a one or more instances of a software instruction processor, or a processing element such as a data processor, or such as a central processing unit (e.g., CPU1, CPU2). According to certain embodiments of the disclosure, two or more instances of a configuration 701 can be coupled by a communications link 715 (e.g., backplane, LAN, PTSN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port $723_1$ and network interface port $723_2$). The configuration 701 can be addressed through one or more network interface ports using an IP address. Any operational element within computing platform 706 can perform sending and receiving operations using any of a range of network protocols, possibly including network protocols that send and receive packets (e.g., network protocol packet $721_1$ and network protocol packet $721_2$).

The computing platform 706 may transmit and receive messages that can be composed of configuration data, and/or any other forms of data and/or instructions organized into a data structure (e.g., communications packets). In some cases, the data structure includes program code instructions (e.g., application code) communicated through Internet 748 and/or through any one or more instances of communications link 715. Received program code may be processed and/or executed by a CPU as it is received and/or program code may be stored in any volatile or non-volatile storage for later execution. Program code can be transmitted via an upload (e.g., an upload from an access device over the Internet 748 to computing platform 706). Further, program code and/or results of executing program code can be delivered to a particular user via a download (e.g., a download from the computing platform 706 over the Internet 748 to an access device).

The configuration 701 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A cluster is often embodied as a collection of computing nodes that can communicate between each other through a local area network (e.g., LAN or VLAN) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or chassis or rack that hosts a finite number of mounted-in computing units. A computing unit in a rack can take on a role as a server, or as a storage unit, or as a networking unit, or any combination therefrom. In some cases a unit in a rack is dedicated to provision of power to the other units. In some cases a unit in a rack is dedicated to environmental conditioning functions such as filtering and movement of air through the rack, and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN.

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic. A processing entity is able to can carry out computations and/or processing steps using one or more processes and/or one or more tasks and/or one or more threads or any combination thereof. Example processing entity embodiments include virtualized controllers, virtual machines and hypervisors.

Some embodiments of a module include instructions that are stored in a memory for execution so as to implement algorithms that facilitate operational and/or performance characteristics pertaining to dynamic resource distribution using periodicity-aware predictive modeling. In some embodiments, a module may include a processing entity and/or one or more state machines and/or combinational logic used to implement or facilitate the operational and/or performance characteristics pertaining to dynamic resource distribution using periodicity-aware predictive modeling.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of dynamic resource distribution using periodicity-aware predictive modeling). Such files or records can be brought into and/or stored in volatile or non-volatile memory.

Further details regarding general approaches to managing data repositories are described in U.S. Pat. No. 8,601,473, titled, "ARCHITECTURE FOR MANAGING I/O AND STORAGE FOR A VIRTUALIZATION ENVIRONMENT" issued on Dec. 3, 2013, which is hereby incorporated by reference in its entirety.

Figure 7B:
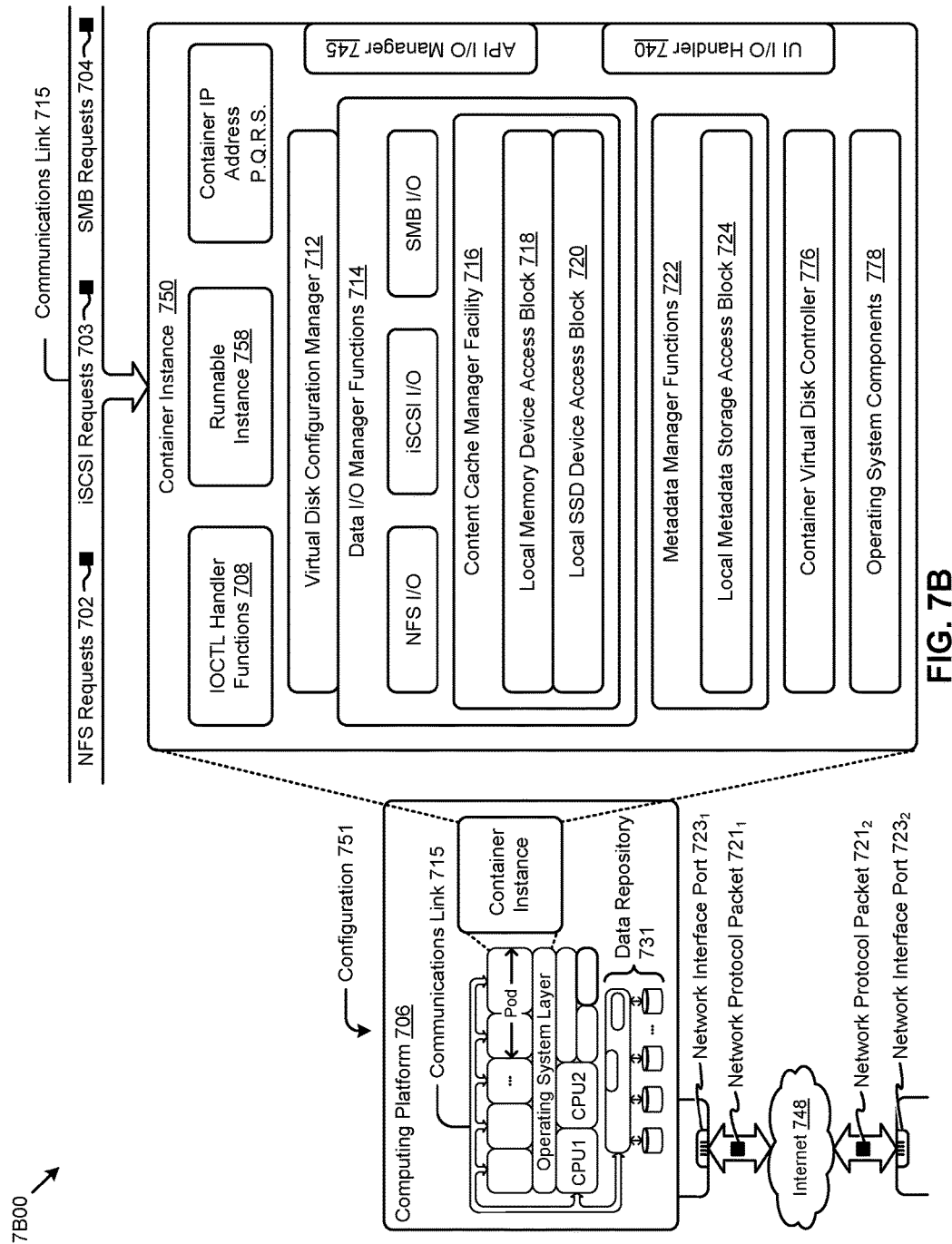

FIG. 7B depicts a virtualized controller implemented by a containerized architecture 7B00. The containerized architecture comprises a collection of interconnected components suitable for implementing embodiments of the present disclosure and/or for use in the herein-described environments. Moreover, the shown containerized architecture 7B00 includes a container instance in a configuration 751 that is further described as pertaining to the container instance 750. The configuration 751 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 750). A container instance can be executed by a processor. Runnable portions of a container instance sometimes derive from a container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container instance (e.g., a Docker container) can serve as an instance of an application container. Any container of any sort can be rooted in a directory system, and can be configured to be accessed by file system commands (e.g., "ls" or "ls-a", etc.). The container might optionally include operating system components 778, however such a separate set of operating system components need not be provided. As an alternative, a container can include a runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method, comprising:
    maintaining, at a storage pool, measurements corresponding to prior usage of a distributed storage resource of a cluster by a plurality of nodes in the cluster, the storage pool comprising an aggregation of one or more storage devices directly attached to respective nodes in the cluster;
    receiving, at a first node of the plurality of nodes in the cluster, the measurements from the storage pool;
    determining, at the first node, a time period for a training window corresponding to a portion of the measurements, wherein the training window bounds a periodically recurring portion of the measurements;
    training, at the first node, a predictive model based at least in part on the periodically recurring portion of the measurements to produce a trained predictive model;
    determining a resource allocation operation based at least in part on a prediction from the trained predictive model.

2. The method of claim 1, further comprising executing the resource allocation operation.

3. The method of claim 1, further comprising comparing a peak resource usage measurement and a mean resource usage measurement to a storage pool predicted resource usage characteristics to determine the resource allocation operation.

4. The method of claim 1, further comprising presenting the resource allocation operation in a user interface.

5. The method of claim 4, further comprising receiving a selection of the resource allocation operation.

6. The method of claim 1, wherein the resource allocation operation is determined based at least in part on a resource allocation rule.

7. The method of claim 1, wherein the measurements pertain to at least one of, a CPU capacity usage, a storage capacity usage, a bandwidth capacity usage, or an IO contention, or a storage IO latency.

8. The method of claim 1, wherein determining the resource allocation operation is performed on a virtual machine above a hypervisor.

9. The method of claim 1, wherein the resource allocation operation pertains to at least one of, migrating a virtualized controller, migrating a virtual machine, migrating a container, adding a node, or adding storage capacity.

10. The method of claim 1, wherein each of the plurality of nodes in the cluster include a controller virtual machine above a hypervisor that presents the aggregation of one or more storage devices to one or more user virtual machines or containers.

11. A non-transitory computer readable medium having stored thereon a sequence of instructions which, when executed by a processor performs a set of acts comprising:
    maintaining, at a storage pool, measurements corresponding to prior usage of a distributed storage resource of a cluster by a plurality of nodes in the cluster, the storage pool comprising an aggregation of one or more storage devices directly attached to respective nodes in the cluster;
    receiving, at a first node of the plurality of nodes in the cluster, the measurements from the storage pool;
    determining, at the first node, a time period for a training window corresponding to a portion of the measurements, wherein the training window bounds a periodically recurring portion of the measurements;
    training, at the first node, a predictive model based at least in part on the periodically recurring portion of the measurements to produce a trained predictive model; and
    determining a resource allocation operation based at least in part on a prediction from the trained predictive model.

12. The computer readable medium of claim 11, wherein the set of acts further comprise executing the resource allocation operation.

13. The computer readable medium of claim 11, wherein the set of acts further comprise comparing a peak resource usage measurement and a mean resource usage measurement to a storage pool predicted resource usage characteristics to determine the resource allocation operation.

14. The computer readable medium of claim 11, wherein the set of acts further comprise presenting the resource allocation operation in a user interface.

15. The computer readable medium of claim 14, wherein the set of acts further comprise receiving a selection of the resource allocation operation.

16. The computer readable medium of claim 11, wherein the resource allocation operation is determined based at least in part on a resource allocation rule.

17. The computer readable medium of claim 11, wherein the measurements pertain to at least one of, a CPU capacity usage, a storage capacity usage, a bandwidth capacity usage, or an TO contention, or a storage TO latency.

18. The computer readable medium of claim 11, wherein determining the resource allocation operation is performed on a virtual machine above a hypervisor.

19. A system, comprising:
a storage medium having stored thereon a sequence of instructions; and
a processor that executes the sequence of instructions to perform a set of acts comprising:
maintaining, at a storage pool, measurements corresponding to prior usage of a distributed storage resource of a cluster by a plurality of nodes in the cluster, the storage pool comprising an aggregation of one or more storage devices directly attached to respective nodes in the cluster;
receiving, at a first node of the plurality of nodes in the cluster, the measurements from the storage pool;
determining, at the first node, a time period for a training window corresponding to a portion of the measurements, wherein the training window bounds a periodically recurring portion of the measurements;
training, at the first node, a predictive model based at least in part on the periodically recurring portion of the measurements to produce a trained predictive model;
and
determining a resource allocation operation based at least in part on a prediction from the trained predictive model.

20. The system of claim 19, wherein the measurements pertain to at least one of, a CPU capacity usage, a storage capacity usage, a bandwidth capacity usage, or an IO contention, or a storage IO latency.

* * * * *